US007081832B2

(12) United States Patent
Nelson et al.

(10) Patent No.: US 7,081,832 B2
(45) Date of Patent: Jul. 25, 2006

(54) METHOD AND APPARATUS FOR OBTAINING DATA REGARDING A PARKING LOCATION

(75) Inventors: David Nelson, Chicago, IL (US); Walt Tracy, Naperville, IL (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

(21) Appl. No.: 10/423,841

(22) Filed: Apr. 25, 2003

(65) Prior Publication Data

US 2004/0212519 A1 Oct. 28, 2004

(51) Int. Cl.
*B60Q 1/48* (2006.01)

(52) U.S. Cl. ................. 340/932.2; 340/933; 455/556.1

(58) Field of Classification Search ............. 340/932.2, 340/933, 937, 942, 905; 455/556.1, 557, 455/556.2; 705/13, 5, 918
See application file for complete search history.

(56) References Cited

U.S. PATENT DOCUMENTS

| | | | | |
|---|---|---|---|---|
| 4,338,587 | A | | 7/1982 | Chiappetti |
| 4,603,390 | A | | 7/1986 | Mehdipour et al. |
| 5,072,380 | A | | 12/1991 | Randelman et al. |
| 5,206,643 | A | | 4/1993 | Eckelt |
| 5,311,186 | A | | 5/1994 | Utsu et al. |
| 5,414,624 | A | | 5/1995 | Anthonyson |
| 5,432,508 | A | | 7/1995 | Jackson |
| 5,710,557 | A | * | 1/1998 | Schuette ................. 340/932.2 |
| 5,737,710 | A | | 4/1998 | Anthonyson |
| 5,745,052 | A | | 4/1998 | Matsuyama et al. |
| 5,751,973 | A | | 5/1998 | Hassett |
| 5,940,481 | A | | 8/1999 | Zeitman |
| 6,085,124 | A | * | 7/2000 | Choi .......................... 700/217 |
| 6,107,942 | A | * | 8/2000 | Yoo et al. ................ 340/932.2 |
| 6,147,624 | A | | 11/2000 | Clapper |
| 6,249,233 | B1 | * | 6/2001 | Rosenberg et al. ...... 340/932.2 |
| 6,340,935 | B1 | | 1/2002 | Hall |
| 6,373,401 | B1 | | 4/2002 | Ho |
| RE37,822 | E | | 8/2002 | Anthonyson |
| 2001/0051531 | A1 | * | 12/2001 | Singhal et al. .............. 455/556 |
| 2002/0029164 | A1 | * | 3/2002 | Sugar et al. .................. 705/13 |

* cited by examiner

*Primary Examiner*—Anh V. La
(74) *Attorney, Agent, or Firm*—Buckley, Maschoff & Talwalker LLC

(57) ABSTRACT

A system, apparatus and computer program code for obtaining data regarding one or more parking locations. According to embodiments of the present invention, an interface can be used to receive data regarding one or more parking locations. Users or devices at one or more parking locations may access the interface to enter, upload, or otherwise provide the information. In some embodiments, a parking location may be or include a parking garage, a parking lot, or one or more parking spots. A parking location may be manned or unmanned and different parking locations may have different configurations or devices (e.g., entry gates, exit gates, ticket dispensers, card readers). In some embodiments, different users entering or providing data for different parking locations may be able to access and use different features of the interface and the interface may be configured differently for different locations.

29 Claims, 21 Drawing Sheets

METHOD AND APPARATUS FOR OBTAINING DATA REGARDING A PARKING LOCATION

CROSS REFERENCE TO RELATED APPLICATION

This application is related to U.S. application Ser. No. 10/423,854, filed Apr. 25, 2003, entitled "Method and Apparatus for Integrating Data Regarding Vehicle Events", and is also related to U.S. application Ser. No. 10/423,469, filed Apr. 25, 2003, entitled "Method and Apparatus for Facilitating Customer Service for a Parking Facility", the contents of both of which are incorporated herein by reference for all purposes.

FIELD OF THE INVENTION

The present invention relates to a method and apparatus for obtaining data regarding a parking location.

BACKGROUND OF THE INVENTION

A manager of one or more parking locations may be interested in collecting information regard tickets issued, tickets collected, revenue collected, etc. for such parking location(s).

It would be advantageous to provide a method and apparatus that provided an ability for data to be collected regarding one or more parking locations.

SUMMARY OF THE INVENTION

Embodiments of the present invention provide a system, method, apparatus, means, and computer program code for obtaining data regarding one or more parking locations. According to embodiments of the present invention, a user desiring to enter information regarding one or more parking locations may access an interface that can be used by the user to provide or entire data regarding the one or more parking locations. In some embodiments, the interface may be provided as part of a Web page or some other resource that is connected to or in communication with multiple parking locations. In some embodiments, a parking location may be or include a parking garage, a parking lot, or one or more parking spots. A parking location may be manned or unmanned and different parking locations may have different configurations or devices (e.g., entry gates, exit gates, ticket dispensers, card readers). In some embodiments, different users entering or providing data for different parking locations may be able to access and use different features of the interface and the interface may be configured differently for different locations.

Additional objects, advantages, and novel features of the invention shall be set forth in part in the description that follows, and in part will become apparent to those skilled in the art upon examination of the following or may be learned by the practice of the invention.

According to some embodiments of the present invention, a method for obtaining data regarding a parking location may include providing an interface (e.g., a web page or web site) adapted to receive data associated with a parking location; and receiving data via the interface, the data being associated with at least one parking location. In some other embodiments, a method for obtaining data regarding a parking location may include providing an interface adapted to receive data associated with parking locations; receiving data via the interface, the data being associated with at least two parking locations; and storing at least a portion of the data. In some further embodiments, a method for obtaining data regarding a parking location may include determining an identifier associated with a parking location; configuring an interface based, at least in part, on the identifier, the interface being adapted to receive data associated with the parking location; providing access to the interface; and receiving data via the interface, the data being associated with the parking location. In some embodiments of the present invention, each of the methods disclosed herein may be implemented by a system, apparatus, computer code or other means.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION

Applicants have recognized that there is a market opportunity for systems, means, computer code, and methods that allow data associated with revenue, tickets, drops, etc. for one or more parking locations to be obtained.

Embodiments of the present invention provide such capabilities, by providing an interface that can be used to receive data regarding one or more parking locations. Users or devices at one or more parking locations may access the interface to enter, upload, or otherwise provide the information. In some embodiments, a parking location may be or include a parking garage, a parking lot, or one or more parking spots. A parking location may be manned or unmanned and different parking locations may have different configurations or devices (e.g., entry gates, exit gates, ticket dispensers, card readers). In some embodiments, different users entering or providing data for different parking locations may be able to access and use different features of the interface and the interface may be configured differently for different locations. These and other features will be discussed in further detail below, by describing a system, computer code, individual devices, and processes according to embodiments of the invention.

System

Figure 1:
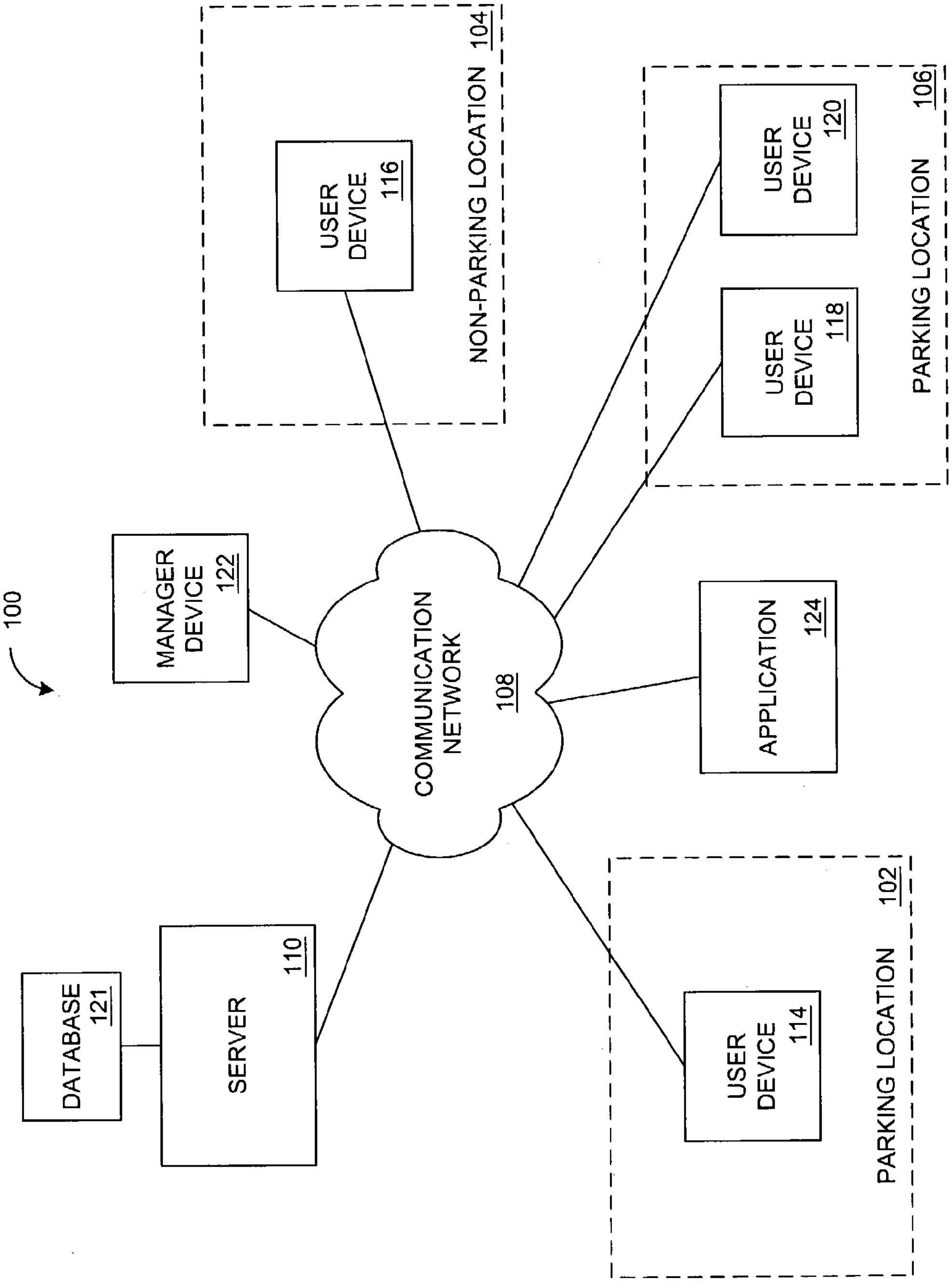
FIG. 1 is a block diagram of a network of parking locations.

Now referring to FIG. 1, an apparatus or system 100 usable with the methods disclosed herein is illustrated. The system 100 is generally representative of one configuration of a system usable with the present invention and other configurations or designs also may be used.

The system 100 includes multiple parking locations 102, 104, 106 that may be connected to a communication network 108 that is itself connected to or in communication with a server or other device 110. More specifically, user device 114 located at or associated with the parking location 102, user device 116 located at or associated with the parking location 104, and user devices 118, 120 located at or associated with the parking location 106 may communicate with the server 110 via the communication network 108 and may be used to provide parking location data to the server 110. The server 110 may store some or all of the data in a remote or local database (e.g., database 121). In addition, in some embodiments, the server 110 may provide some or all of the parking location data to other devices (e.g., manager device 122) or applications (e.g., application 124) and/or allow such devices or applications to access the data in the database 121. For example, the application 124 may include analysis software, report generating software, etc. that can be used to review and analyze the data obtained by the server 110 to produce reports regarding income, expenses, use, shift allocations, etc. for one or more parking locations.

In some embodiments, the server 110 may implement or host a Web site or other electronic resource that can be accessed via the user devices 114, 116, 118, 120. In some embodiments, the server 100 might comprise a single device or computer, a networked set or group of devices or computers, a mainframe or host computer, a workstation, etc. In some embodiments, the server 110 also may function as a database server and/or as a user device and/or be located at a parking location.

The user or client devices 114, 116, 118, 120 may allow entities to interact with the server 110 and the remainder of the system 100. The user devices 114, 116, 118, 120 also may enable a user to access Web sites, software, databases, etc. hosted or operated by the server 110. Possible user devices include a personal computer, portable computer, mobile or fixed user station, workstation, network terminal or server, cellular telephone, kiosk, dumb terminal, personal digital assistant, etc. In some embodiments, information regarding one or more users and/or one or more user devices may be stored in, or accessed from, a user information database and/or a user device information database. Also, in some embodiments, the system 100 may include one or more user devices that are not located at a parking location.

Many different types of implementations or hardware/software configurations can be used in the system 100 and with the methods disclosed herein and the methods disclosed herein are not limited to any specific hardware/software configuration for the system 100 or any of its components.

The communications network 108 might be or include the Internet, the World Wide Web, or some other public or private computer, cable, telephone, client/server, peer-to-peer, or communications network or intranet. The communications network 108 illustrated in FIG. 1 is meant only to be generally representative of cable, computer, telephone, peer-to-peer or other communication networks for purposes of elaboration and explanation of the present invention and other devices, networks, etc. may be connected to the communications network 108 without departing from the scope of the present invention. In some embodiments the communications network 108 may include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, one or more user devices may be connected directly to a server 110 without departing from the scope of the present invention. Moreover, as used herein, communications include those enabled by wired or wireless technology. The devices shown in FIG. 1 need not be in constant communication. For example, a user device may communicate with the server 10 only when such communication is appropriate or necessary.

Process Description

Figure 2:
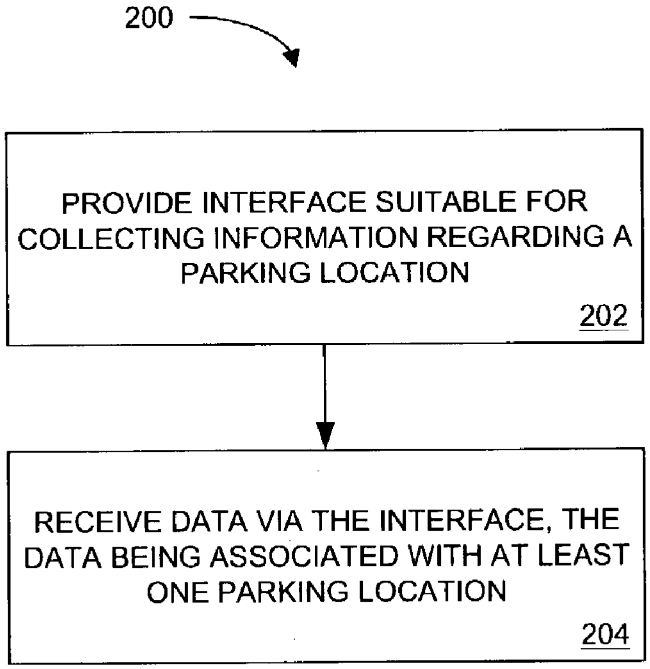
FIG. 2 is a flowchart of a first embodiment of a method in accordance with the present invention.

Reference is now made to FIG. 2, where a flow chart 200 is shown which represents the operation of a first embodiment of the present invention. The particular arrangement of elements in the flow chart 200 is not meant to imply a fixed order to the steps; embodiments of the present invention can be practiced in any order that is practicable. In some embodiments, some or all of the steps of the method 200 may be performed or completed by the serve 110, as will be discussed in more detail below.

Processing begins at a step 202 during which the server 110 provides an interface that can be used to collect, receive, or otherwise obtain data regarding or associated with one or more parking locations. During a step 204, the server 110 receives data via the interface. In some embodiments, the data may be received from a user device located at a parking location and/or a user device providing data on behalf of one or more parking locations. Discussion of one potential interface is provided in more detail below.

Figure 3:
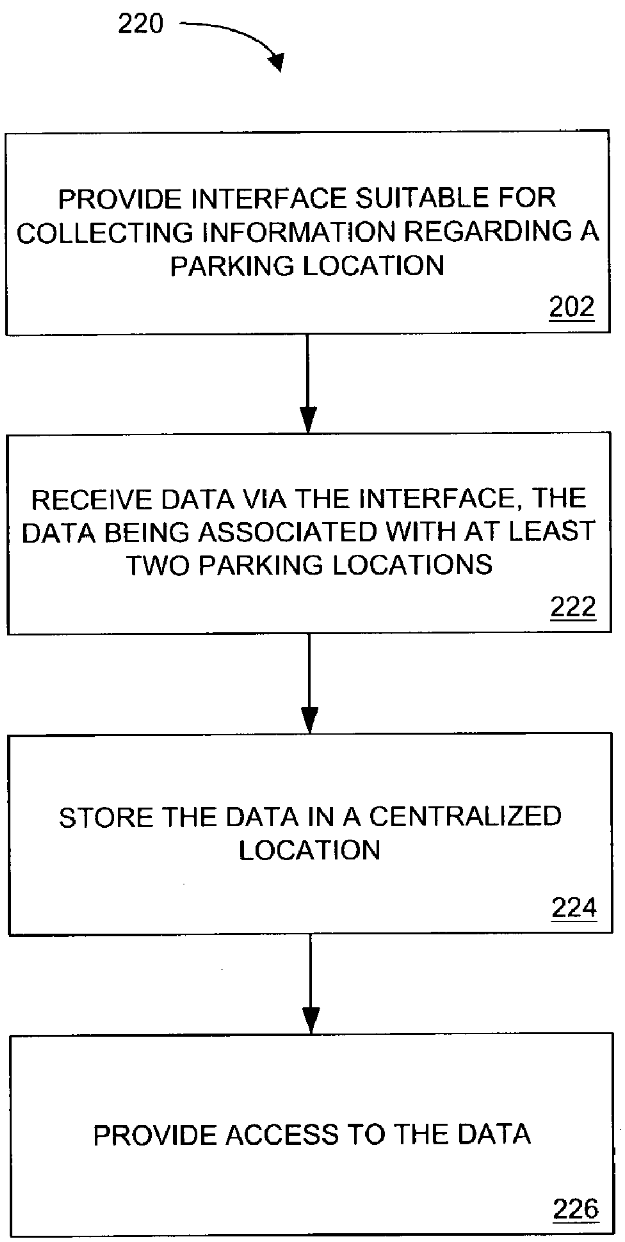
FIG. 3 is a flowchart of a second embodiment of a method in accordance with the present invention.

Reference is now made to FIG. 3 where a flow chart 220 is shown which represents the operation of a second embodiment of the present invention. The particular arrangement of elements in the flow chart 220 is not meant to imply a fixed order to the steps; embodiments of the present invention can be practiced in any order that is practicable. In some embodiments, some or all of the steps of the method 220 may be performed or completed by the server 110, as will be discussed in more detail below.

The method 220 includes the step 202 previously discussed above. In addition, the method 220 includes a step 222 during which the server 110 collects, receives, or otherwise obtains data via the interface, the data being associated with two or more parking locations. During a step 224, the server 110 stores the data in one or more centralized locations (e.g., the database 121). During a step 226, the server 110 allows access to some or all of the data. For example, the server 110 may allow the application 124 to retrieve, query, or otherwise access the database 121 to obtain some or all of the data. As another example, the server 110 may send some or all of the data to the device 122.

Figure 4:
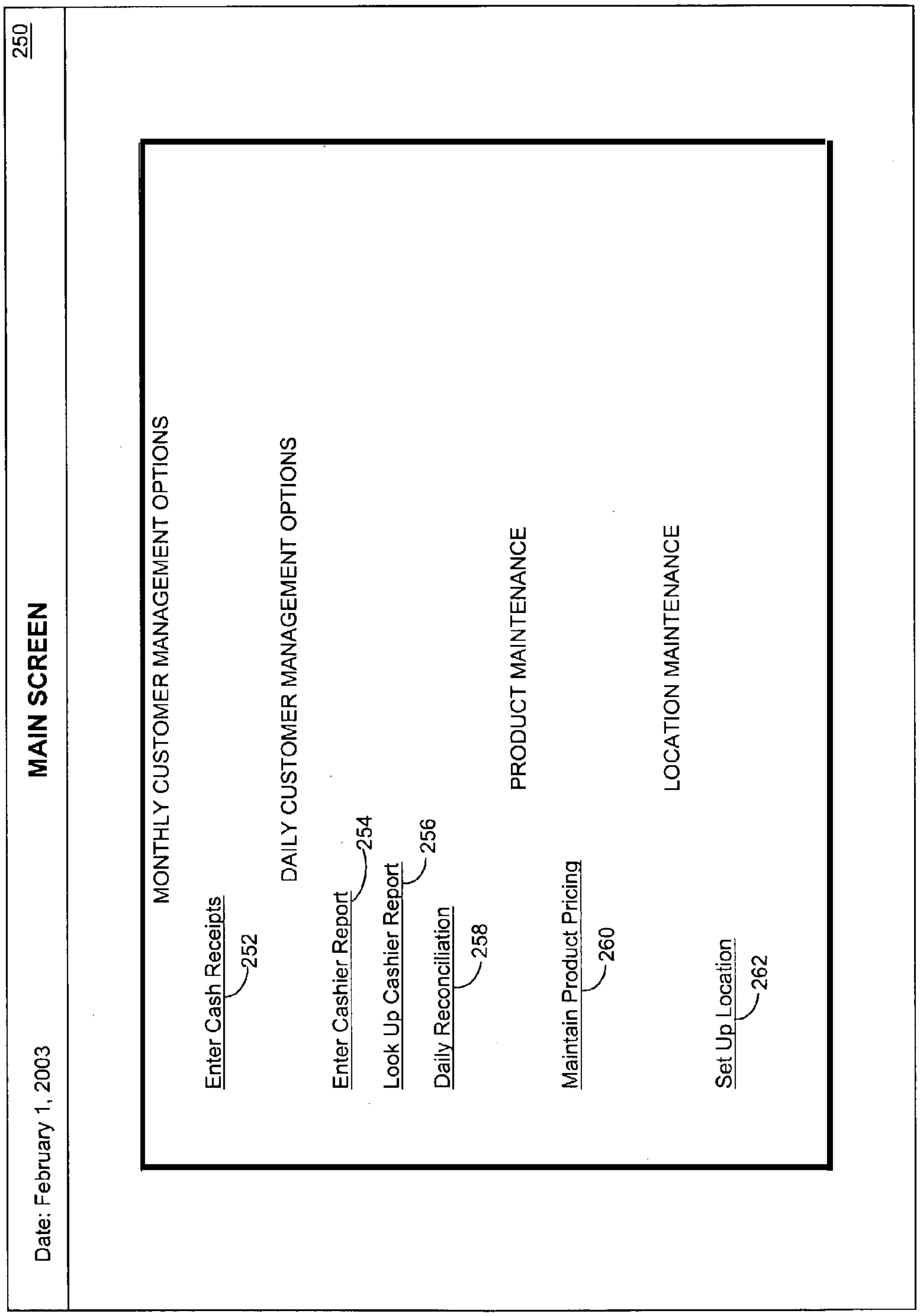
FIG. 4 is an illustration of a representative interface that may be used in some embodiments of the present invention.

Now referring to FIG. 4, a representative screen or panel 250 is illustrated that may be used with systems and methods of the present invention and be included in or implemented with an interface displayed or provided by the server 110. The server 110 may provide the screen 250 as part of a Web page or other electronic resource that is accessible by a user device. As illustrated in FIG. 4, the screen 250 may include information regarding the current date (e.g., Feb. 1, 2003) and selectable or clickable links "Enter Cash Receipts" 252, "Enter Cashier Report" 254, "Look Up Cashier Report" 256, "Daily Reconciliation" 258, "Maintain Product Pricing" 260, and "Set Up Location" 262.

The screen 250 may allow for information to be provided regarding monthly parkers and daily (also referred to as transient) parkers. For example, clicking on the link "Enter Cash Receipts" may allow a user to provide data regarding one or more monthly parkers and/or may cause the server 110 to display, provide, or download one or more interface screens, pages, windows, etc.

Figure 5:
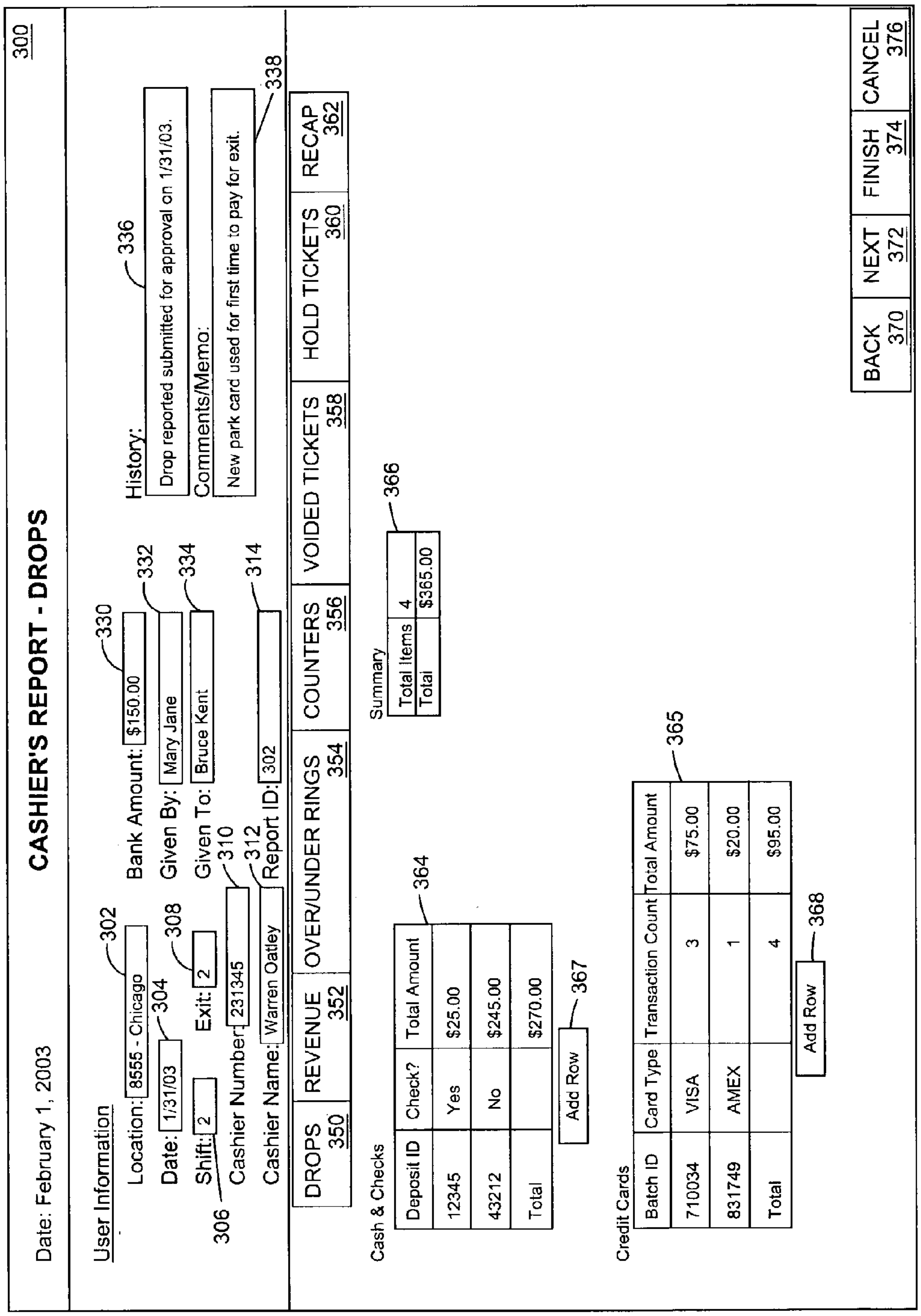
FIG. 5 is another illustration of a representative interface that may be used in some embodiments of the present invention.

A user selecting or clicking on the "Enter Cashier Report" link 254 may cause the server 110 to display, provide, serve, or download a "CASHIER'S REPORT—DROPS" screen, panel, or window 300 illustrated in FIG. 5. The screen 300 may include several text blocks in which the user can enter or provide information regarding a parking location, a specific shift at the parking location, a specific exit station at a parking station, a specific cashier or other employee at the parking location, etc. For example, the user may enter in an identifier of a parking location of interest into text block 302, the date of interest into text block 304, the shift of interest into text block 306, the exit station of interest into text block 308, the cashier number of interest into text block 310, the cashier name of interest into text block 312, and/or a report identifier into text block 314.

As further examples, the screen 300 may include a text block 330 in which the user can enter or provide data indicative of a cash amount on hand at a designated time (e.g., the beginning of the day, the start of a specific shift) as given by the person identified in text box 332 to the person identified in the text box 334. The screen 300 also may provide additional text blocks 336, 338 in which other information can be entered.

As illustrated in FIG. 5, the screen 300 includes DROP button 350, REVENUE button 352, OVER/UNDER RINGS button 354, COUNTERS button 356, VOIDED TICKETS button 358, HOLD TICKETS button 360, and RECAP button 362. The screen 300 is operating in the DROPS mode. The user may switch to other modes by clicking on or selecting or clicking on any of the other buttons 352, 354, 356, 358, 360, 362. A drop refers to a bank deposit made by the cashier identified in the blocks 310, 312 and may include payments made by cash, check, credit card, etc.

While in the DROPS mode, the screen 300 may display tables 364, 365, 366. The table 366 includes the total summary information as provided by the user in the tables 364 and 365.

The user may enter or provide deposit identification information, check information, and amount information in the box 364 for each drop that is made during shift "2" (as identified in the block 306) at exit station "2" (as identified in the block 308). For example, the cashier "Warren Oatley" made two deposits of cash and checks. The deposit identified as "12345" included a check and had a total amount of $25.00. The deposit identified as "43212" did not include any checks and had a total amount of $245.00. If the user needs to add information regarding additional drops in the table 364, the user can select or click on button 367 which will add another row to the table 364.

For drops based on credit cards or other accepted types of charge cards, debit cards, private label cards, etc., the user can enter or provide information via the table 365 including a batch identifier associated with each drop, the type of credit card associated with each drop, the number of credit card transactions included in the drop, and the total amount of the drop. For example, the credit card drop having a batch identifier "710034" included three transactions made using VISA™ credit cards and having a total amount of $75.00. If the user needs to add information regarding additional drops in the table 365, the user can select or click on button 368 which will add another row to the table 365.

The screen 300 also may include selectable or clickable BACK button 370, NEXT button 372, FINISH button 374, and CANCEL button 376. Selecting or clicking on the BACK button 370 may cause the server 110 to provide, serve, or display a previous Web page, screen, or window, e.g., the screen 250. Selecting or clicking on the NEXT button 372 may cause the server 110 to provide, serve, or display the next Web page, screen, or window, e.g., a Web page, screen, or window directed to revenue. Selecting or clicking on the FINISH button 374 may cause the server 110 to assume that the user is done with the screen 300, cause the server 110 to display, serve, or provide another Web page, screen, or window, cause the server 110 to exit the screen 300, or cause the server 110 to initiate or perform some other designated action. Selecting or clicking on the CANCEL button 376 may cause the server 110 to clear or reset some or all of the data entered by the user using the screen 300.

Figure 6:
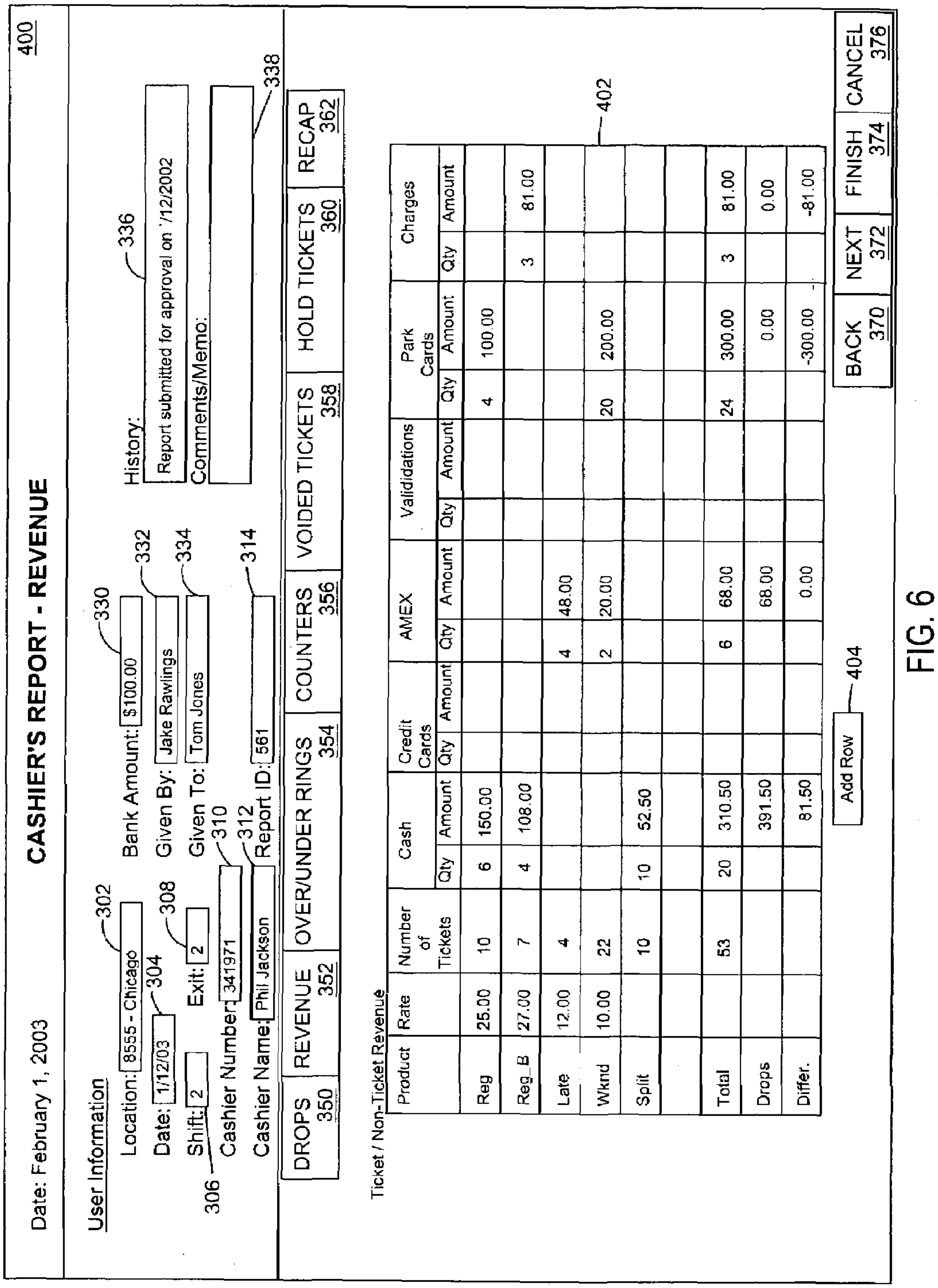
FIG. 6 is another illustration of a representative interface that may be used in some embodiments of the present invention.

A user selecting the "REVENUE" button 352 may cause the server 110 to display, server, or provide a "CASHIER'S REPORT—REVENUE" screen, Web page, panel, or window 400, as illustrated in FIG. 6, which may be used by the user to enter or provide information regarding revenue for a parking location. For example, the screen 400 may include a table 402 in which the user can enter information regarding the number of tickets for different parking products, each of which has an associated rate, the methods of payments (e.g., cash, credit cards, parking cards issued by the parking location or another entity for use at the parking location to pay for parking, charge accounts) used by parkers to pay for the products, whether or not any of the tickets were validated by another source (e.g., a merchant near the parking location), etc. A "split" ticket may be a ticket that has a rate that is split between two other products in the table 402.

As examples of the use of the screen, Web page, window, or panel 400, as illustrated in FIG. 6, the cashier named "Phil Jackson" worked shift "2" at exit station "2" on Jan. 12, 2003. During this shift for this cashier, a total of fifty-three tickets were collected by the cashier, ten of which had an associated parking rate of twenty-five dollars. Of those ten tickets, six were paid for by cash for a total cash amount of $150.00 and four were paid for by park cards for a total amount of $100.00. As another example, of the fifty-three tickets, seven had an associated parking rate of twenty-seven dollars. Of those seven tickets, four were paid for by parkers in cash for a total cash amount of $108.00 and three were charged by parkers to charge accounts associated with the parking location and the parkers for a total amount of $81.00. The table 402 also includes information regarding the total amount collected for each type of payment method and the total number of drops for the different payment methods. If the user needs to add more rows to identify additional parking products, the user may click on or select button 404, which will add another row to the table 402.

Figure 7:
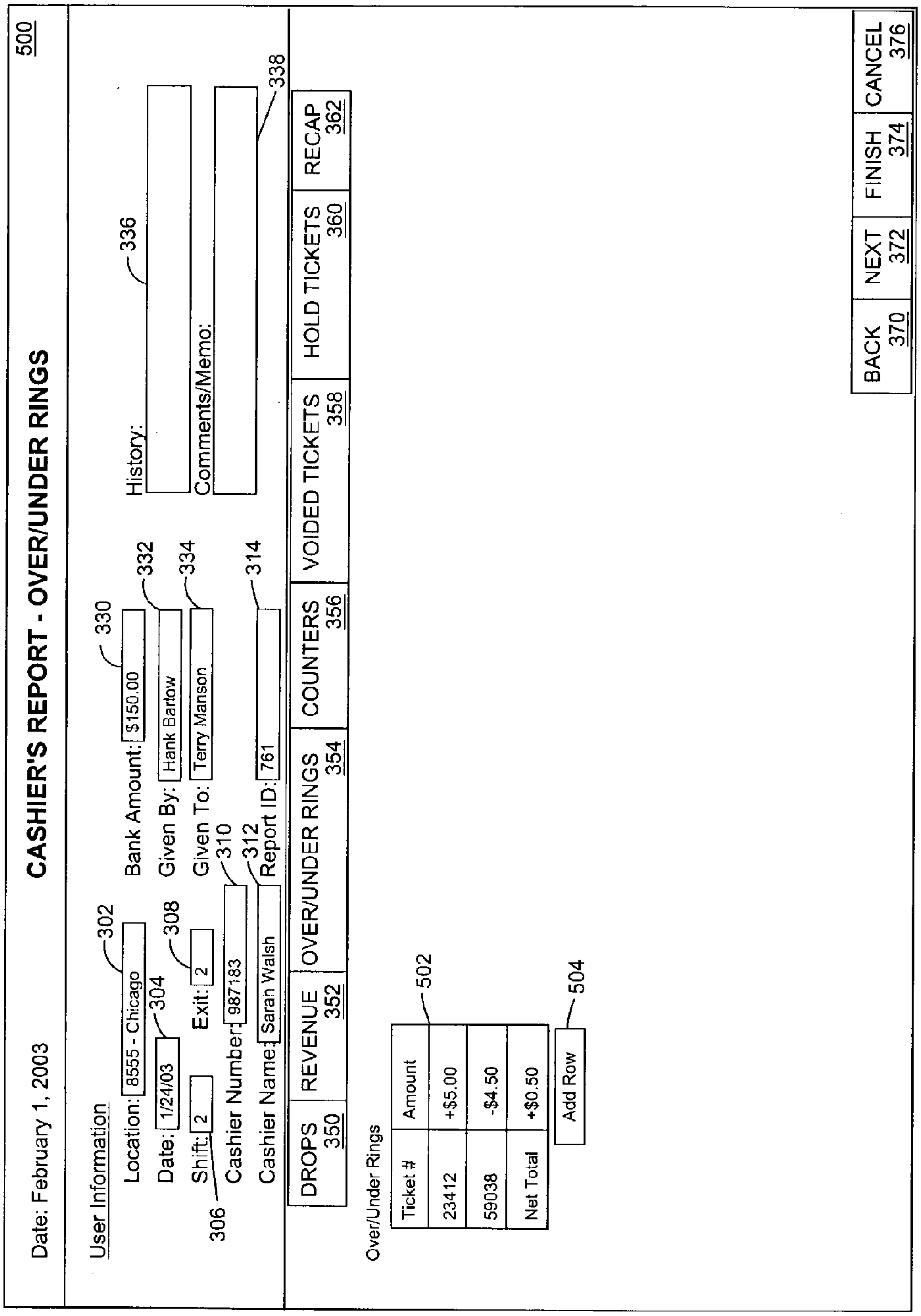
FIG. 7 is another illustration of a representative interface that may be used in some embodiments of the present invention.

A user selecting the "OVER/UNDER RINGS" button 352 may cause the server 110 to display, server, or provide a "CASHIER'S REPORT—OVER/UNDER RINGS" screen, Web page, panel, or window 500, as illustrated in FIG. 7, which may be used by the user to enter or provide information regarding over and/or under rings associated with a parking location. An over or under ring is a transaction that has been entered with an incorrect amount at a point-of-sale device (e.g., a cash register) at the parking location, which can be corrected via the screen 500. For example, the screen 500 may include a table 502 in which the user can enter or provide information regarding one or more over and/or under rings. For example, ticket number "23412" in table 502 is an over ring in the amount of five dollars while ticket number "59038" is an under ring in the amount of four dollars and fifty cents. If the user needs to add more rows to identify additional over or under rings, the user may select or click on button 504, which will add another row to the table 502.

A user selecting the "COUNTERS" button 356 may cause the server 110 to display, server, or provide a "CASHIER'S REPORT—COUNTERS" screen, Web page, or window 600, which may be used by the user to enter or provide information regarding the types of counters available at an exit station parking location. A counter may be or include a sensor, switch, gate, or other device or electrical component at an exit station at parking location that counts vehicles entering and exiting the parking location. The screen 600 may include a table 602 that allows a user to enter or provide information regarding such counters. For example, as illustrated in the table 602, a user may enter the number of different types of closing counters (i.e., loop, gate, register) and opening counters (i.e., loop gate, register) for exit station "2".

A user selecting the "VOIDED TICKETS" button 358 may cause the server 110 to display, server, or provide a "CASHIER'S REPORT—VOIDED TICKETS" screen, Web page, or window 700, which may be used by the user to enter or provide information regarding the voided tickets by a cashier at a parking location. The screen 700 may include a table 702 in which such information can be provided. A user may enter the number of tickets that have been voided and the reason for the void. For example, as illustrated in the table 702, three tickets were voided as they belonged to employees, one ticket was voided as it was used by a monthly parker who did not have his or her pass, one ticket was voided because the person did not actually park in the parking location (i.e., the person drove in and out of the parking location), two tickets were voided as part of a promotion by, or participated in by, the parking location, four tickets were voided because they were damaged, and two tickets were voided as the parker used a privilege of some type to avoid payment for parking.

A user selecting the "HOLD TICKETS" button 360 may cause the server 110 to display, server, or provide a "CASHIER'S REPORT—HOLD TICKETS" screen, Web page, or window 800, which may be used by the user to enter or provide information regarding hold tickets at a parking location. A hold ticket is a ticket that is dispensed or provided to a parker during a shift that is not returned during the shift. That is, the parker enters the parking location during one shift and leaves the parking location during another shift. As illustrated in table 802, six tickets are identified that were issued during the current shift but not collected. If the user needs to add more rows to identify additional hold tickets, the user may select or click on button 804, which will add another row to the table 802.

A user selecting the "RECAP" button 362 may cause the server 110 to display, server, or provide a "CASHIER'S REPORT—RECAP" screen, Web page, or window 900, which may be used by the user to view or provide summary information regarding a parking location. For example, the screen 900 may include table 902 in which a user can enter information regarding exit station "2" at the parking location. As illustrated in table 902, exit station "2" issued 1,053 tickets and had eleven hold tickets from the previous shifts for a total of 1,064 issued tickets. In addition, exit station "2" had 1,051 revenue tickets received, five voided tickets, and had eight current holds at the end of the shift. The screen 900 also may include a table 904 that includes information regarding the total drop amount (e.g., $459.00) that took place during the shift at exit station "2" and the total revenue collected (e.g., $759.50) during the shift at exit station Referring once again to screen 250 in FIG. 4, a user may select or click on the "Look Up Cashier Report" link 256. In response, the server 110 may provide, display, or serve a Web page, screen, or window that includes some or all of the options and/or information provided in the screens 300, 400, 500, 600, 700, 800, 900. The user may be prompted to provide a, date, password, employee number, etc. before the server 110 provides access to such screens or information.

Figure 12:
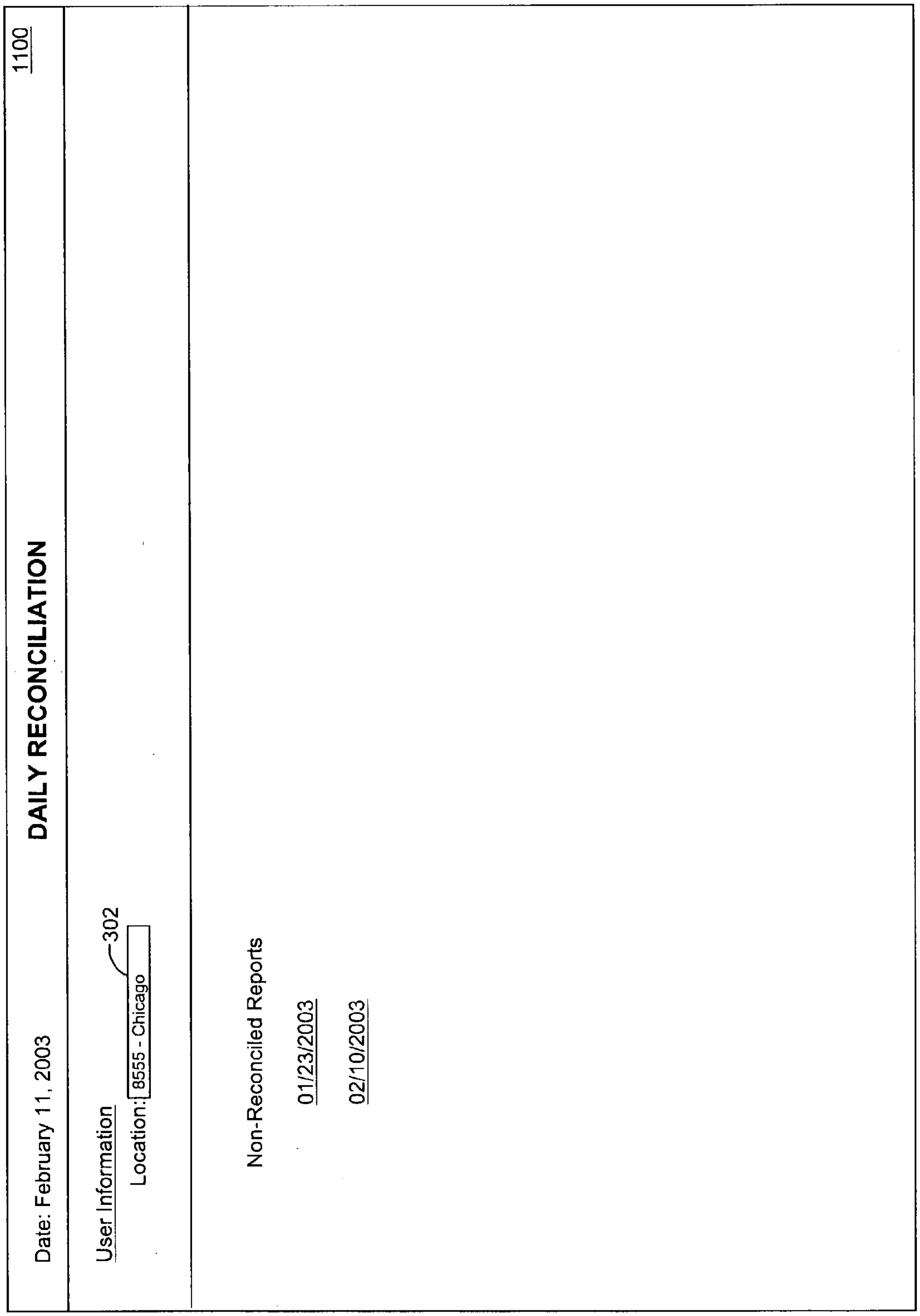
FIG. 12 is another illustration of a representative interface that may be used in some embodiments of the present invention.
Figure 13:
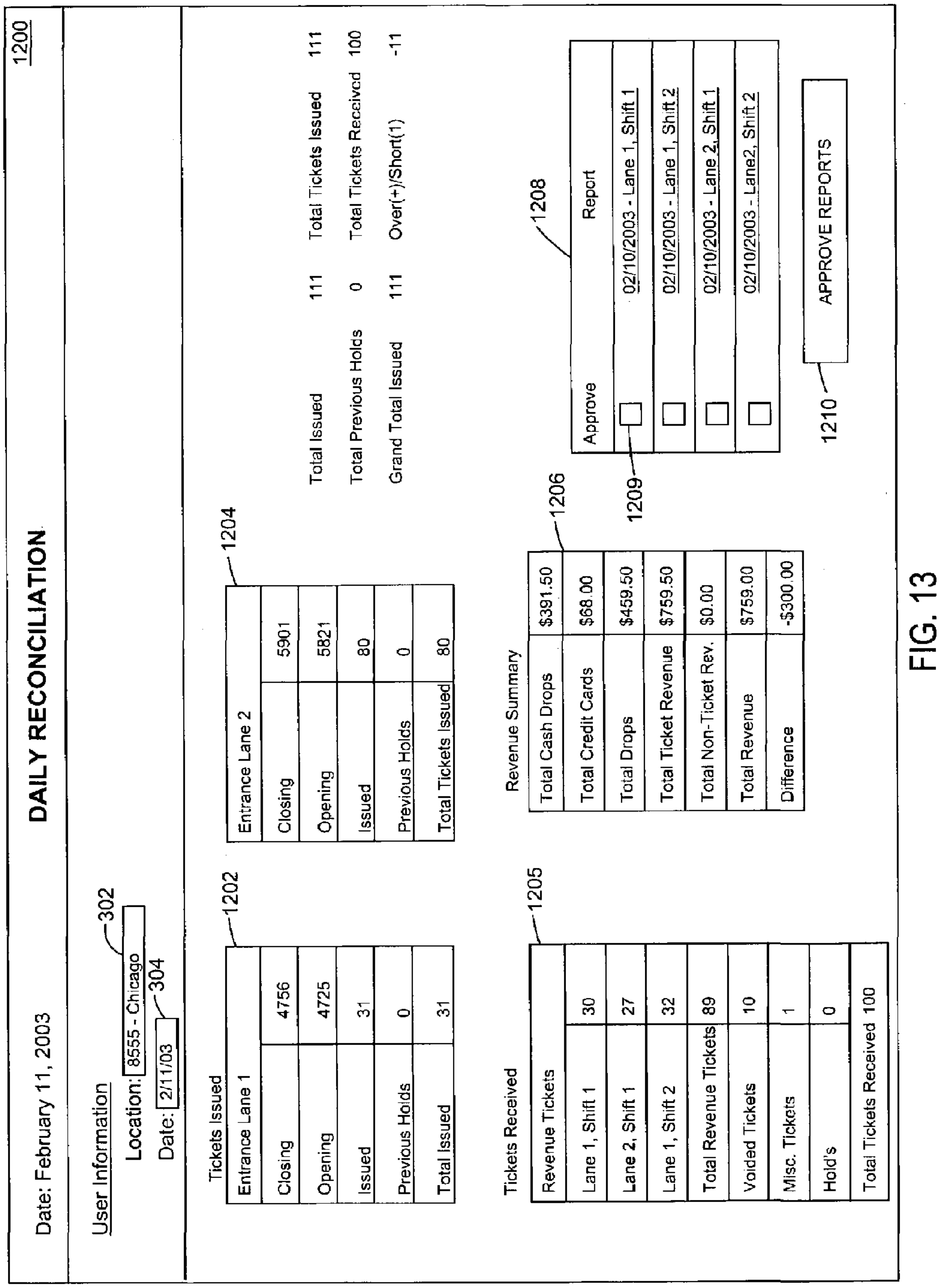
FIG. 13 is another illustration of a representative interface that may be used in some embodiments of the present invention.

If a user selects or clicks on the "Daily Reconciliation" link 258 on the screen 250, the server 100 may provide, serve, or display a screen, window, or panel 1100 as illustrated in FIG. 12. The screen 1100 may include dates or other information (e.g., "01/23/2003") regarding unclosed days for a parking location and may allow a user to "close out" a day at a parking location, approve information as provided by a user via the screens 300, 400, 500, 600, 700, 800, 900. Clicking on or selecting an unclosed date entry (e.g., "Feb. 10, 2003") may cause the server 1100 to bring up or display a summary screen for the date at the parking location, as illustrated by screen, Web page, window, or panel 1200 in FIG. 13 for Feb. 10, 2003. Such summary information may include information regarding tickets issued, received, held over from the beginning of the day, etc.

The screen 1200 may include tables 1202 and 1204 in which are displayed information regarding tickets issued by entrance lane "1" and entrance lane "2", respectively, for the parking location "8555—Chicago". A table 1205 displays information regarding revenue tickets received for different shifts, hold tickets, voided tickets, etc. A table 1206 displays information regarding cash and credit card drops, ticket revenue, non-ticket revenue, etc. for the parking location on Feb. 10, 2003. A table 1208 includes information regarding the different shifts and/or cashiers reports for the parking location on Feb. 10, 2003, that can be approved. For example, checking box 1209 indicates an approval of the cashier report for Lane 1, Shift 1 for Feb. 10, 2003, which can be submitted or confirmed by selecting or clicking on APPROVE REPORTS button 1210. A user selecting or clicking on the link "02/10/2003—Lane 1, Shift 1" may cause the server to display one or more of the screens 300, 400, 500, 600, 700, 800, 900 and the information associated with the parking location "8555—Chicago" and Feb. 10, 2003, so that the user can see the information previously entered via those screens and which form the basis for the information displayed on the screen 1200.

Figure 14:
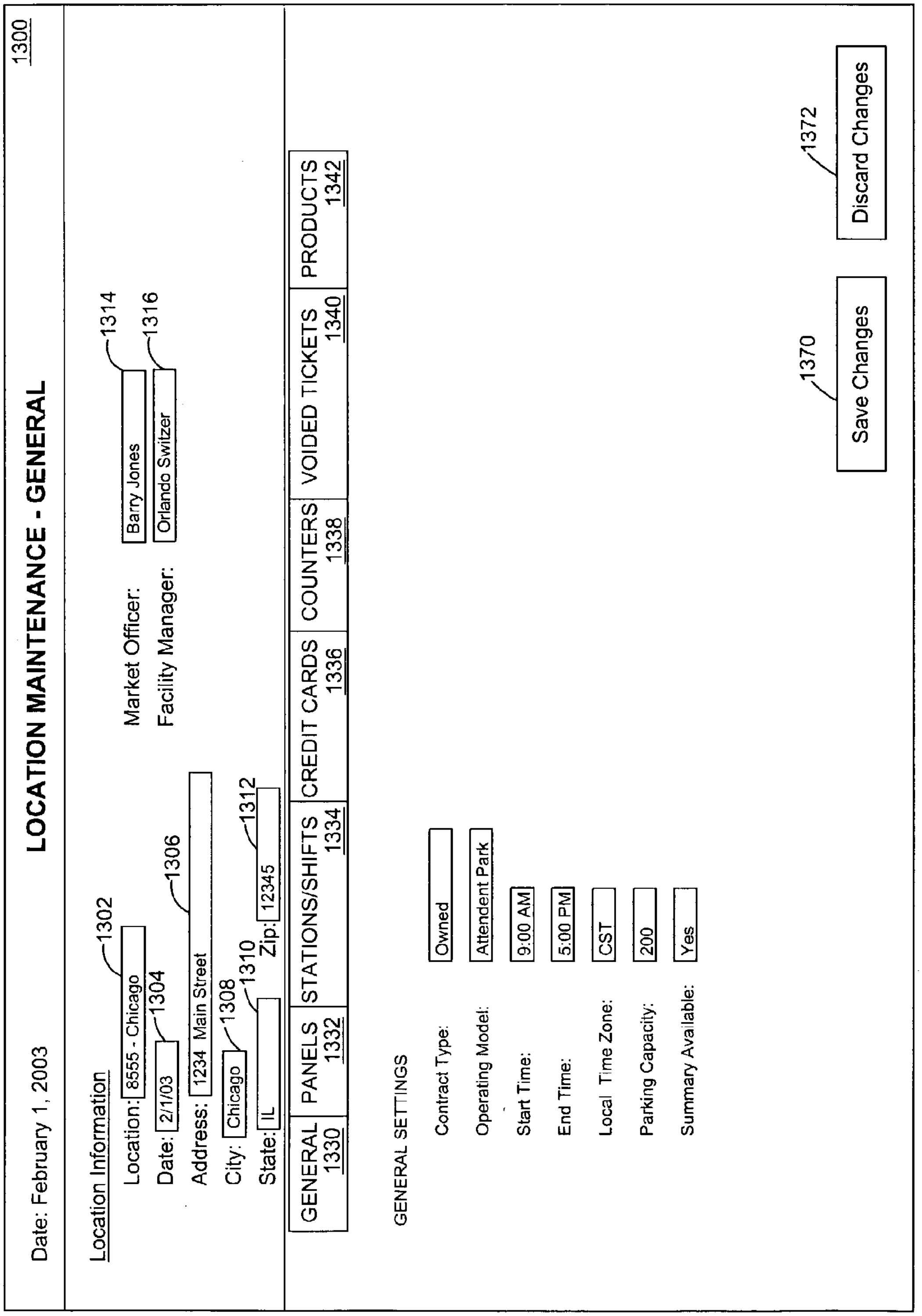
FIG. 14 is another illustration of a representative interface that may be used in some embodiments of the present invention.

Referring once again to screen 250 in FIG. 4, a user may select or click on the "Set Up Location" link 262. In response, the server 110 may provide, display, or serve a Web page, screen, or window 1300 that allows a user to configure how the screens 300, 400, 500, 600, 700, 800, 900 may be displayed or look to a user entering or providing information regarding a particular parking location using the screens, as illustrated in FIG. 14. In addition, the screen 1300 may allow a user to provide information regarding a parking allocation that may be used on other screens, other parts of an interface, etc.

The screen 1300 includes text blocks 1302, 1304, 1306, 1308, 1310, and 1312 in which a user of the screen 1300 can enter or provide information regarding the location and address of the parking location and the date the information is being entered. In addition, the screen 1300 may include text blocks 1314, 1316 in which a user of the screen 1300 can enter or provide information regarding personal associated with the parking location identified in the location text block 1302.

The screen 1300 may include a number of selectable buttons 1330, 1332, 1334, 1336, 1338, 1340, 1342 in which a user of the screen to access other screens. Selecting or clicking on the "GENERAL" button 1330 may cause display of the screen 1300, which allows the user to provide general information regarding the parking location identified in the block 1302 (e.g., "8555—Chicago") such as, for example, the contract type, operating model, start or opening time, closing or end time, local time zone, and the parking capacity for the parking location. The user also may be able to indicate whether or not a summary is available, which may include or provide additional information regarding the parking location. The screen 1300 also may include a "Save Changes" button 1370 and a "Discard Changes" button 1372 that allow a user to save or discard, respectively, changes made or entered via the screen 1300.

Figure 15:
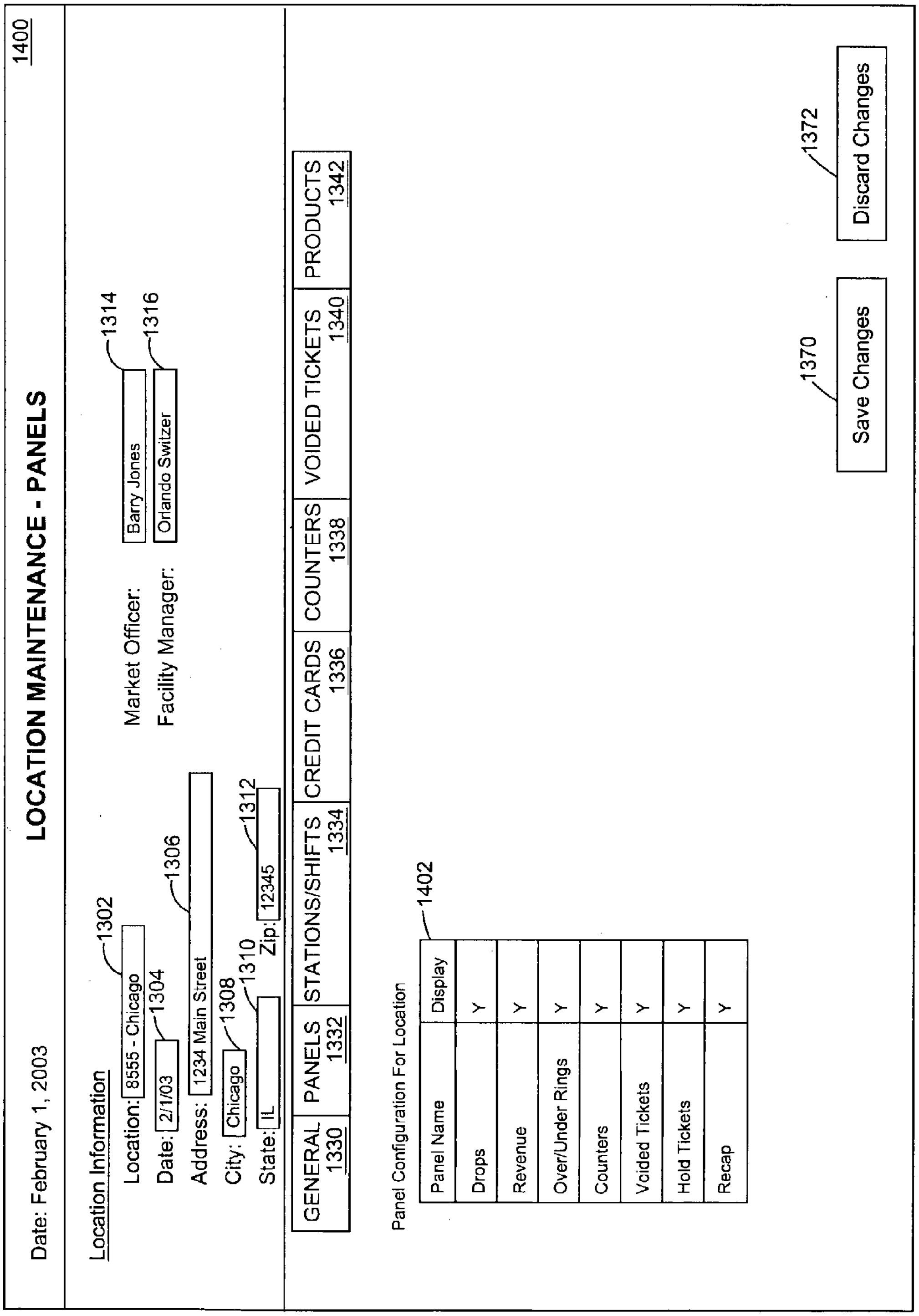
FIG. 15 is another illustration of a representative interface that may be used in some embodiments of the present invention.

A user selecting the "PANELS" button 1332 may cause the server 110 to display, server, or provide a "LOCATION MAINTENANCE—PANELS" screen, Web page, panel, or window 1400, which may be used by the user to indicate which of the buttons "DROPS" 350, "REVENUE" 352, "OVER/UNDER RINGS" 354, "COUNTERS" 356, "VOIDED TICKETS" 358, "HOLD TICKETS" 360, and/or "RECAP" 362 should be displayed on the screens 300, 400, 500, 600, 700, 800, 900 when a user is attempting to provide information regarding a particular parking location, as illustrated in FIG. 15. As a result, a user of the screen 1400 can determine whether or not a person entering a cashier's report can view or use the screens 300, 400, 500, 600, 700, 800, 900. For example, the screen 1400 is being used to enter information regarding the parking location identified as "8555—Chicago" in the block 1302 and includes a table 1402 where the panel or button configuration for the screens 300, 400, 500, 600, 700, 800, 900 and the availability of the screens 300, 400, 500, 600, 700, 800, 900 is determined. As illustrated in FIG. 2, all of the buttons 350, 352, 354, 356, 358, 360, 362 have been configured for display and are then available on the screens 300, 400, 500, 600, 700, 800, 900. As a result, each of the screens 300, 400, 500, 600, 700, 800, 900 also are available for use when a user enters information regarding the parking location identified as "8555—Chicago". Different parking locations may have different configurations and/or different screens and features associated with them.

Figure 16:
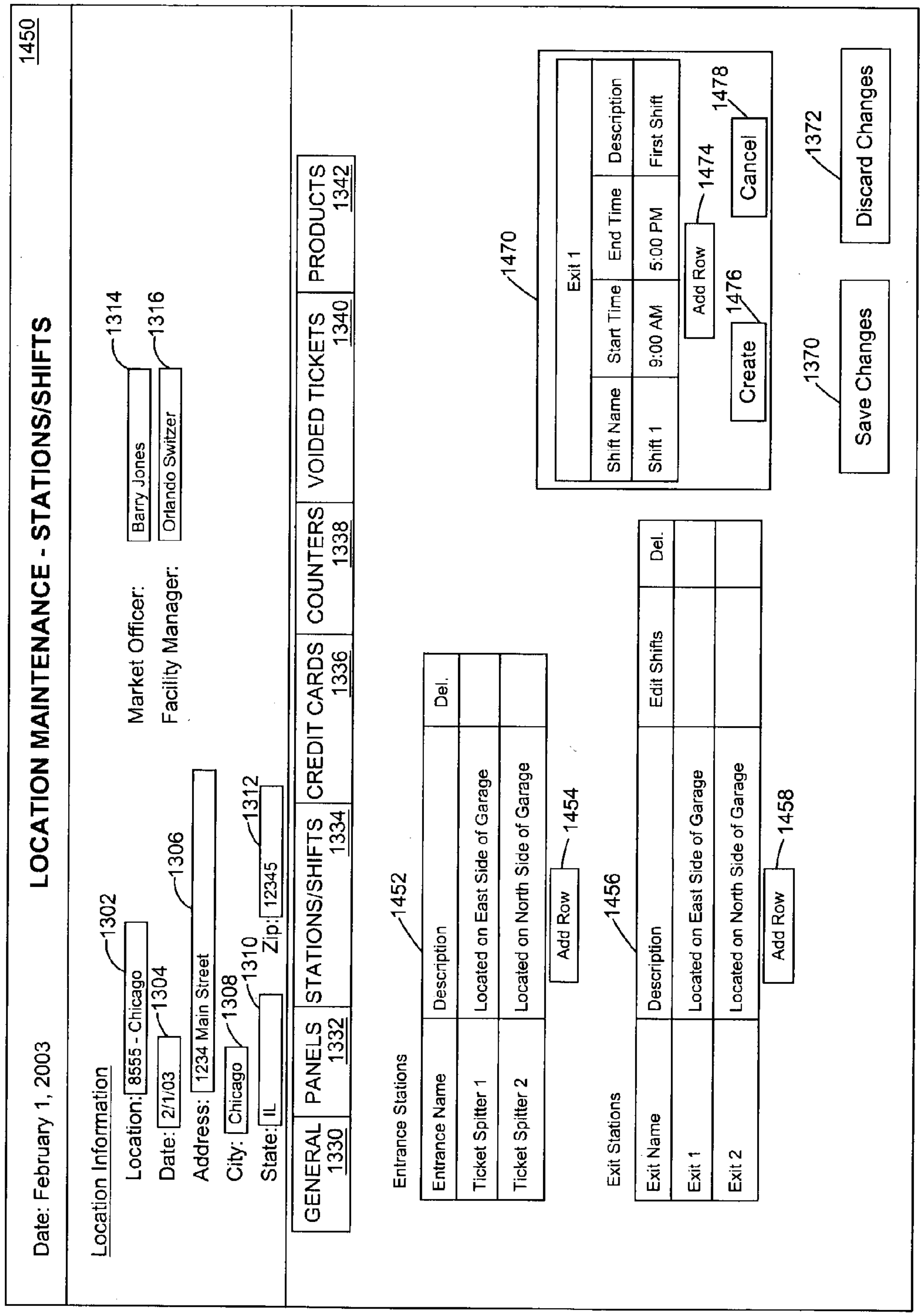
FIG. 16 is an illustration of a representative interface that may be used in some embodiments of the present invention.

A user selecting the "STATIONS/SHIFTS" button 1334 may cause the server 110 to display, server, or provide a "LOCATION MAINTENANCE —STATIONS/SHIFTS" screen, Web page, panel, or window 1450, which may be used by the user to indicate the number and location of entrance and exit stations and the number and duration of shifts for a parking location, as illustrated in FIG. 16. For example, the screen 1450 includes a table 1452 in which a user of the screen 1450 may include information regarding the number of entrance stations and their descriptions for the parking location identified as "8555—Chicago" in block 1302. If the user needs to add more rows to the table 1452, the user may select or click on button 1454, which will add another row to the table 1452. The user also may delete entries/rows in the table 1452 by making or selecting an entry in the "Del." column of the table 1452.

The screen 1450 also may include a table 1456 in which a user of the screen 1450 may include information regarding the number of exit stations and their descriptions for the parking location identified as "8555—Chicago" in block 1302. If the user needs to add more rows to the table 1456, the user may select or click on button 1458, which will add another row to the table 1456. The user also may delete entries/rows in the table 1456 by making or selecting an entry in the "Del." column of the table 1456.

The screen 1450 also may include a table 1470 in which the user may enter or provide information regarding the number of shifts, their start times, their end times, etc. for the parking location identified as "8555 —Chicago" in block 1302. For example, the table 1470 includes information regarding shift information for the exit station identified as "Exit 1" in the table 1456. The user can add additional shifts to the exit station "Exit 1" by selecting button 1474 and confirm addition of the new shifts by selecting CREATE button 1476. The use may cancel or reset information provided in the table 1470 by selecting or clicking on button 1478.

Figure 17:
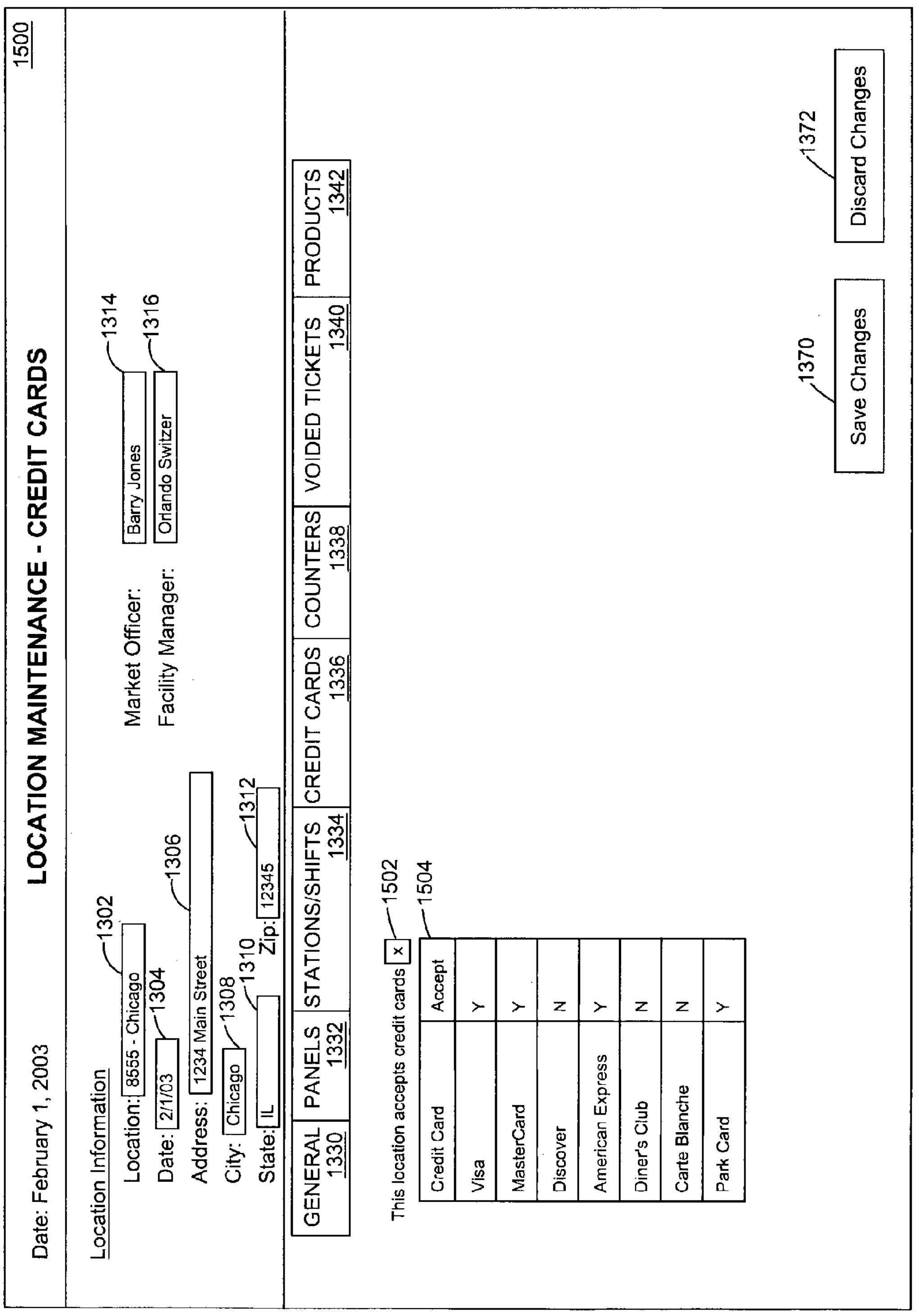
FIG. 17 is another illustration of a representative interface that may be used in some embodiments of the present invention.

A user selecting the "CREDIT CARDS" button 1336 may cause the server 110 to display, server, or provide a "LOCATION MAINTENANCE—CREDIT CARDS" screen, Web page, or window 1500, which may be used by the user to indicate the types of credit cards that may be used by parkers to make payments for the parking location identified as "8555—Chicago" in block 1302, as illustrated in FIG. 17. The screen 1500 includes a check box 1502 in which the user can indicate whether or not the parking location accepts or does not accept credit cards and a table 1504 in which the user can indicate which specific cards can be used at the parking location "8555—Chicago". Different parking locations may accept different combinations of cards for use by parkers to make payments.

Figure 8:
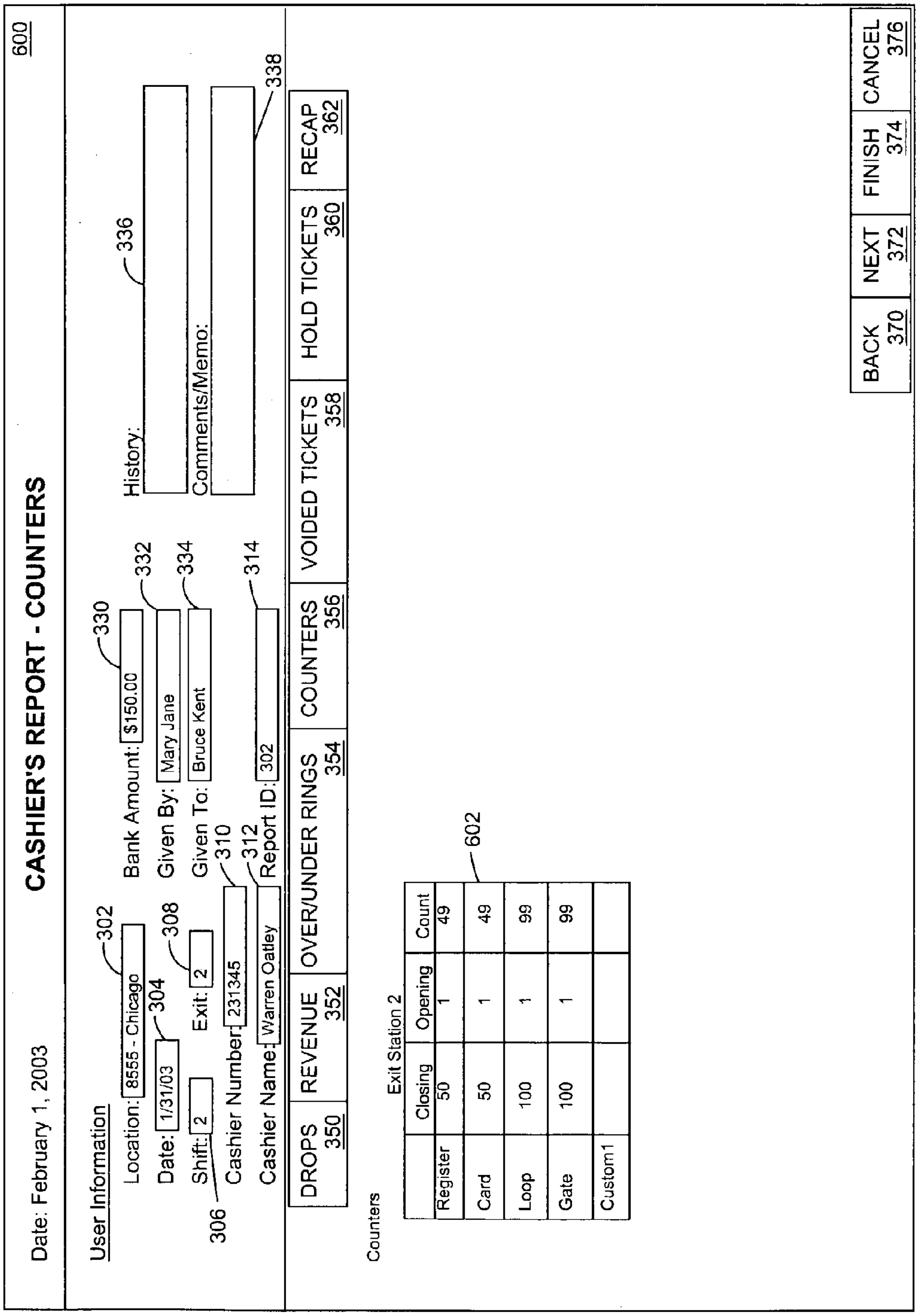
FIG. 8 is another illustration of a representative interface that may be used in some embodiments of the present invention.
Figure 18:
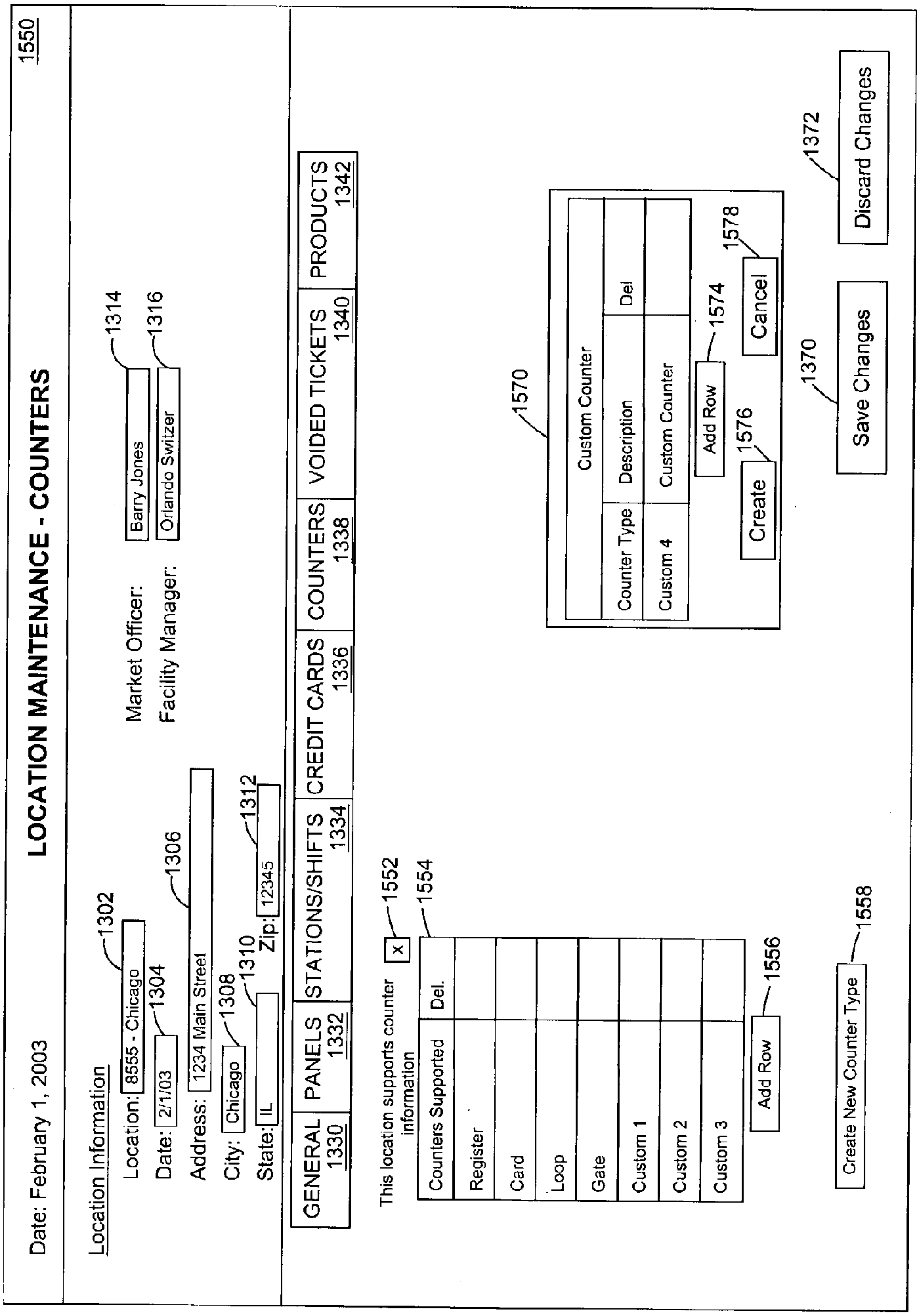
FIG. 18 is another illustration of a representative interface that may be used in some embodiments of the present invention.

A user selecting the "COUNTERS" button 1338 may cause the server 110 to display, server, or provide a "LOCATION MAINTENANCE—COUNTERS" screen, Web page, panel, or window 1550, which may be used by the user to indicate the types counters available at the parking location "8555—Chicago" identified in the block 1302, as illustrated in FIG. 18. The information provided via the screen 1500 may govern the counter types presented in the table 602 in FIG. 8. The screen 1550 includes a check box 1552 in which the user can indicate whether or not the parking location supports counter information and a table 1554 in which the user can indicate which types of counters are supported at the parking location "8555—Chicago". If the user needs to add more rows to the table 1554, the user may select or click on button 1556, which will add another row to the table 1554. The user also may delete entries/rows in the table 1554 by making or selecting an entry in the "Del." column of the table 1554.

If the user wishes to create a new counter type for the table 1554, the user may select or click on button 1558, which may cause the server 110 to provide or display window 1570 in which the user can add information regarding additional counter types associated with the parking location "8555—Chicago". The user can add additional counters to the parking location "8555—Chicago" by selecting button 1574 and confirm the new counter created by selecting CREATE button 1576. The use may cancel or reset information provided in the table 1570 by selecting or clicking on CANCEL button 1578.

Figure 9:
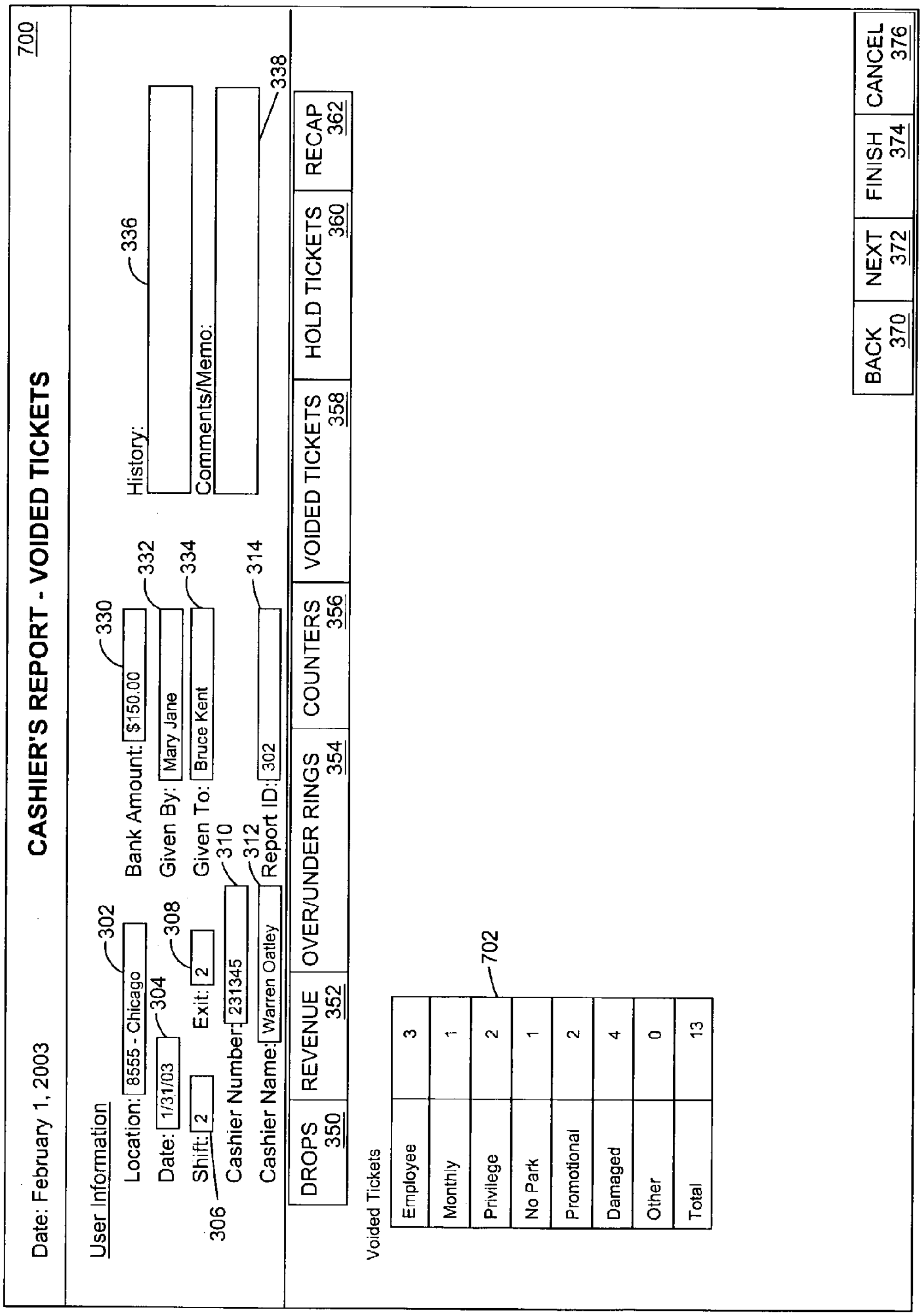
FIG. 9 is another illustration of a representative interface that may be used in some embodiments of the present invention.
Figure 10:
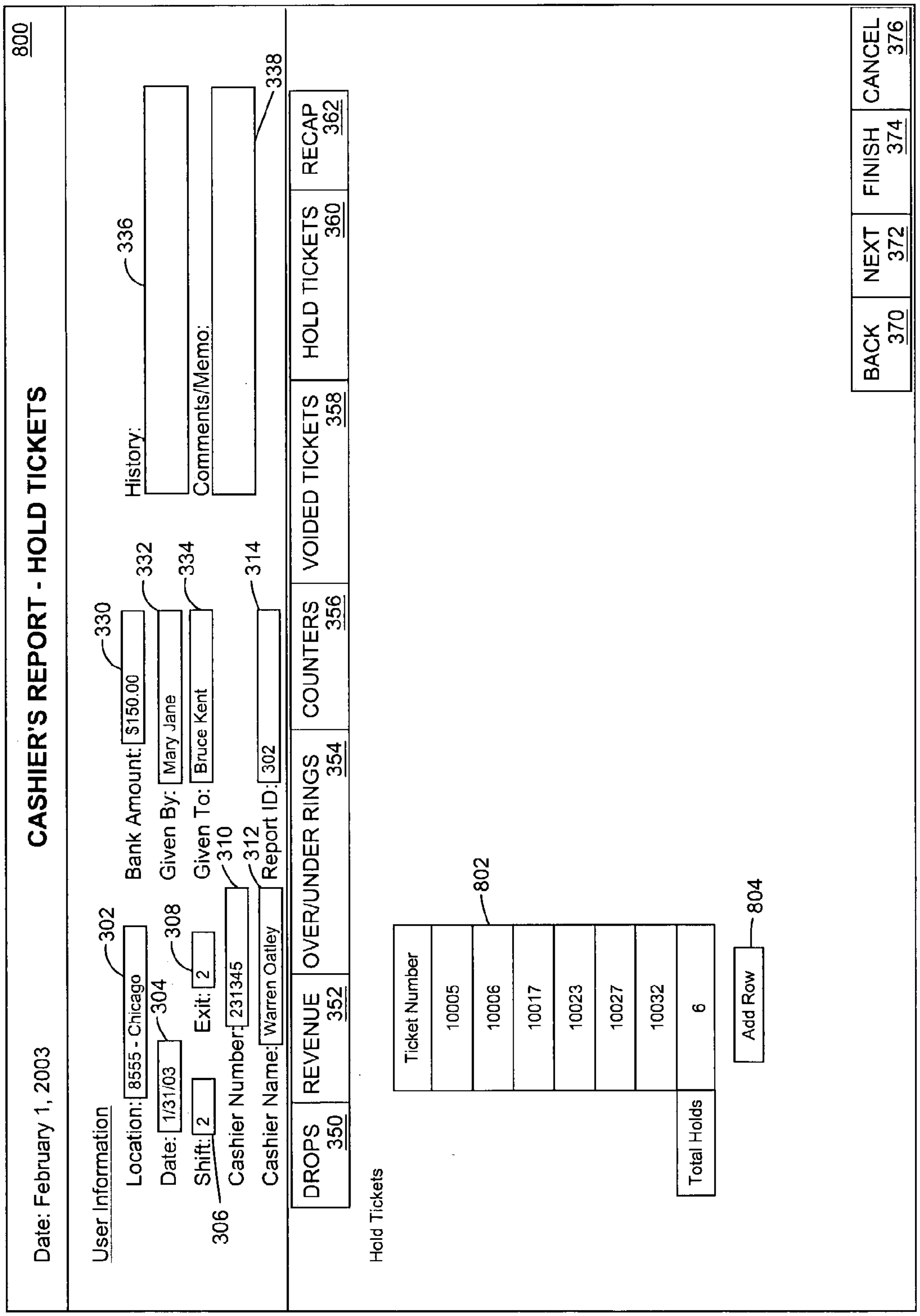
FIG. 10 is an illustration of a representative interface that may be used in some embodiments of the present invention.
Figure 11:
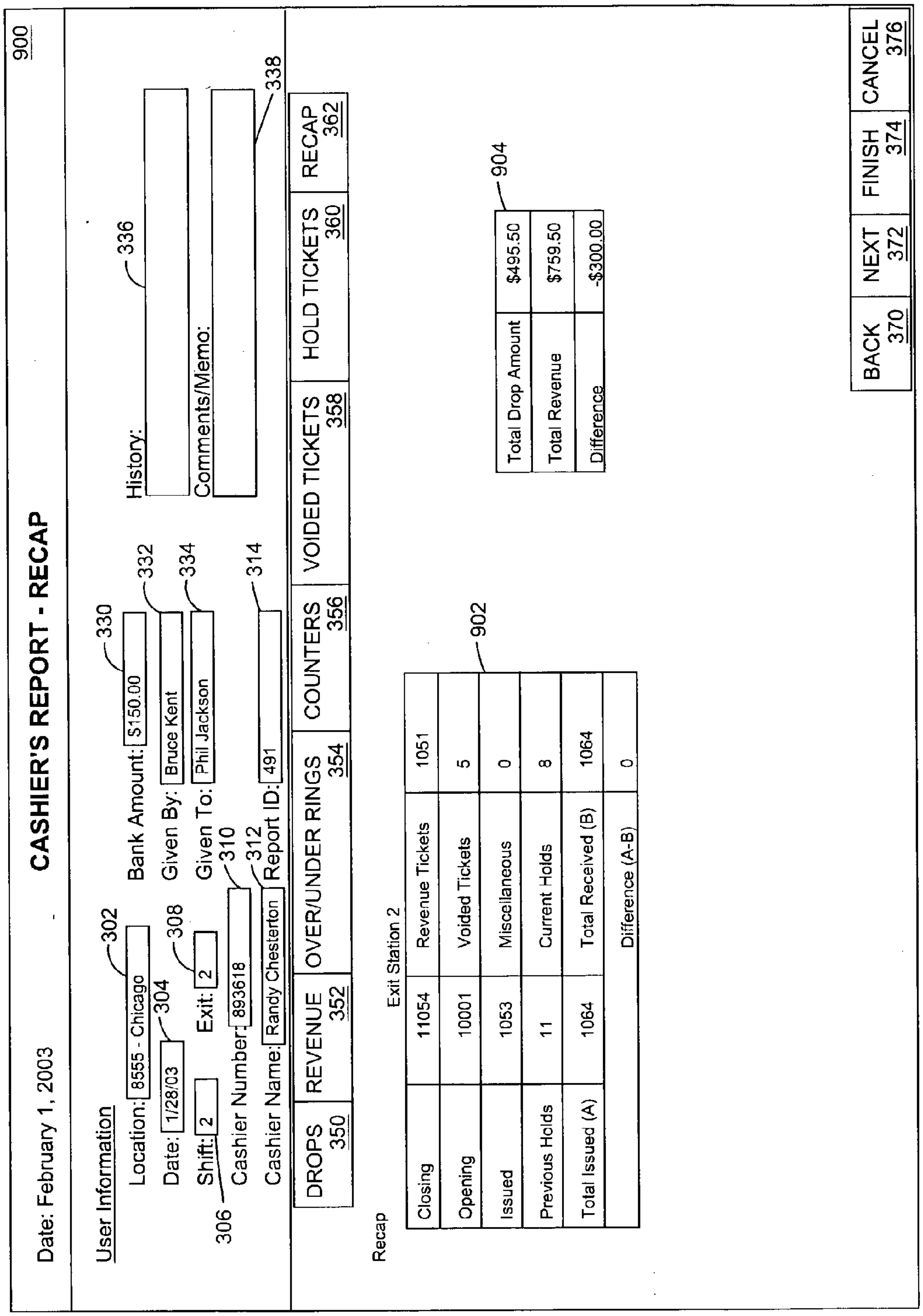
FIG. 11 is another illustration of a representative interface that may be used in some embodiments of the present invention.
Figure 19:
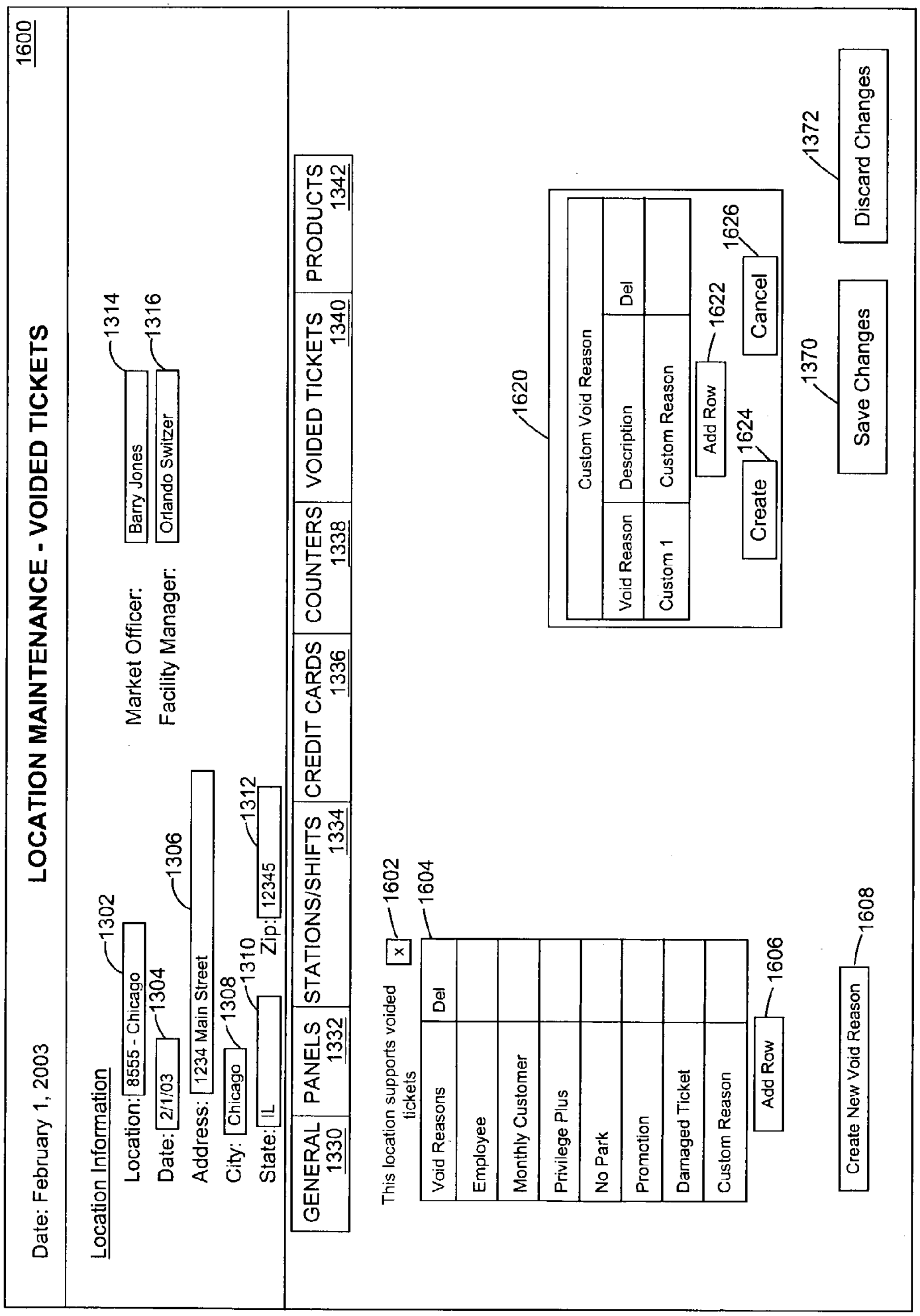
FIG. 19 is another illustration of a representative interface that may be used in some embodiments of the present invention.

A user selecting the "VOIDED TICKETS" button 1340 may cause the server 110 to display, server, or provide a "LOCATION MAINTENANCE—VOIDED TICKETS" screen, Web page, or window 1600, which may be used by the user to indicate the reasons why a voided ticket may be accepted at the parking location "8555—Chicago" identified in the block 1302, as illustrated in FIG. 19. The information provided via the screen 1600 may govern the reasons for void tickets presented in the table 702 in FIG. 9. The screen 1600 includes a check box 1602 in which the user can indicate whether or not the parking location supports or allows voided tickets and a table 1604 in which the user can indicate which reasons voided tickets may be allowed at the parking location "8555—Chicago". If the user needs to add more rows to the table 1604, the user may select or click on button 1606, which will add another row to the table 1606. The user also may delete entries/rows in the table 1604 by making or selecting an entry in the "Del." column of the table 1604.

If the user wishes to create a new counter type for the table 1604, the user may select or click on button 1608, which may cause the server 110 to provide or display window 1620 in which the user can add information regarding additional reasons why voided tickets may be accepted at parking location "8555—Chicago". The user can add additional reasons to the parking location "8555—Chicago" by selecting button 1622 and confirm the new reasons created by selecting CREATE button 1624. The use may cancel or reset information provided in the table 1620 by selecting or clicking on CANCEL button 1626.

Figure 20:
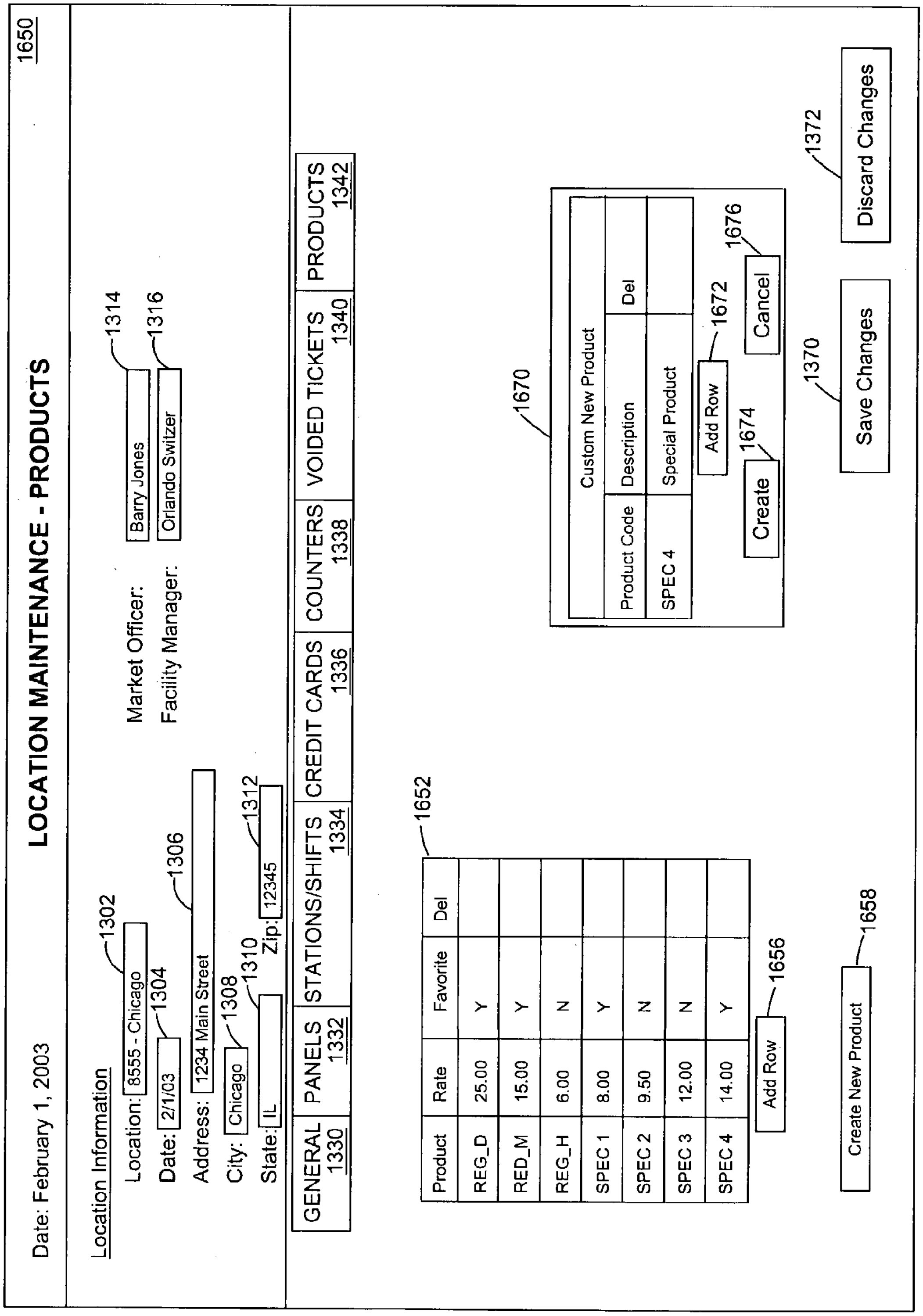
FIG. 20 is another illustration of a representative interface that may be used in some embodiments of the present invention.

A user selecting the "PROIDUCTS" button 1650 may cause the server 110 to display, server, or provide a "LOCATION MAINTENANCE—PRODUCTS" screen, Web page, panel, or window 1650, which may be used by the user to indicate the parking products and associated parking rates associated with the parking location "8555—Chicago" identified in the block 1302, as illustrated in FIG. 20. The screen 1650 also may be provided when the "Maintain Product Pricing" link is selected on the screen 250.

The information provided via the screen 1650 may govern the products and pricing for parking as presented in the table 402 in FIG. 6. Designating a product as a "favorite" may cause the parking product to be added to a "favorites" list for use by people entering information via the table 400 in screen 400. If the user needs to add more rows to the table 1652, the user may select or click on button 1656, which will add another row to the table 1652. The user also may delete entries/rows in the table 1652 by making or selecting an entry in the "Del." column of the table 1652.

If the user wishes to create a new product type for the table 1652, the user may select or click on button 1658, which may cause the server 110 to provide or display window 1670 in which the user can add information regarding additional product types available at parking location "8555—Chicago". The user can add additional product types to the parking location "8555—Chicago" by selecting button 1672 and confirm the new product types created by selecting CREATE button 1674. The use may cancel or reset information provided in the table 1670 by selecting or clicking on CANCEL button 1676.

Server

Figure 21:
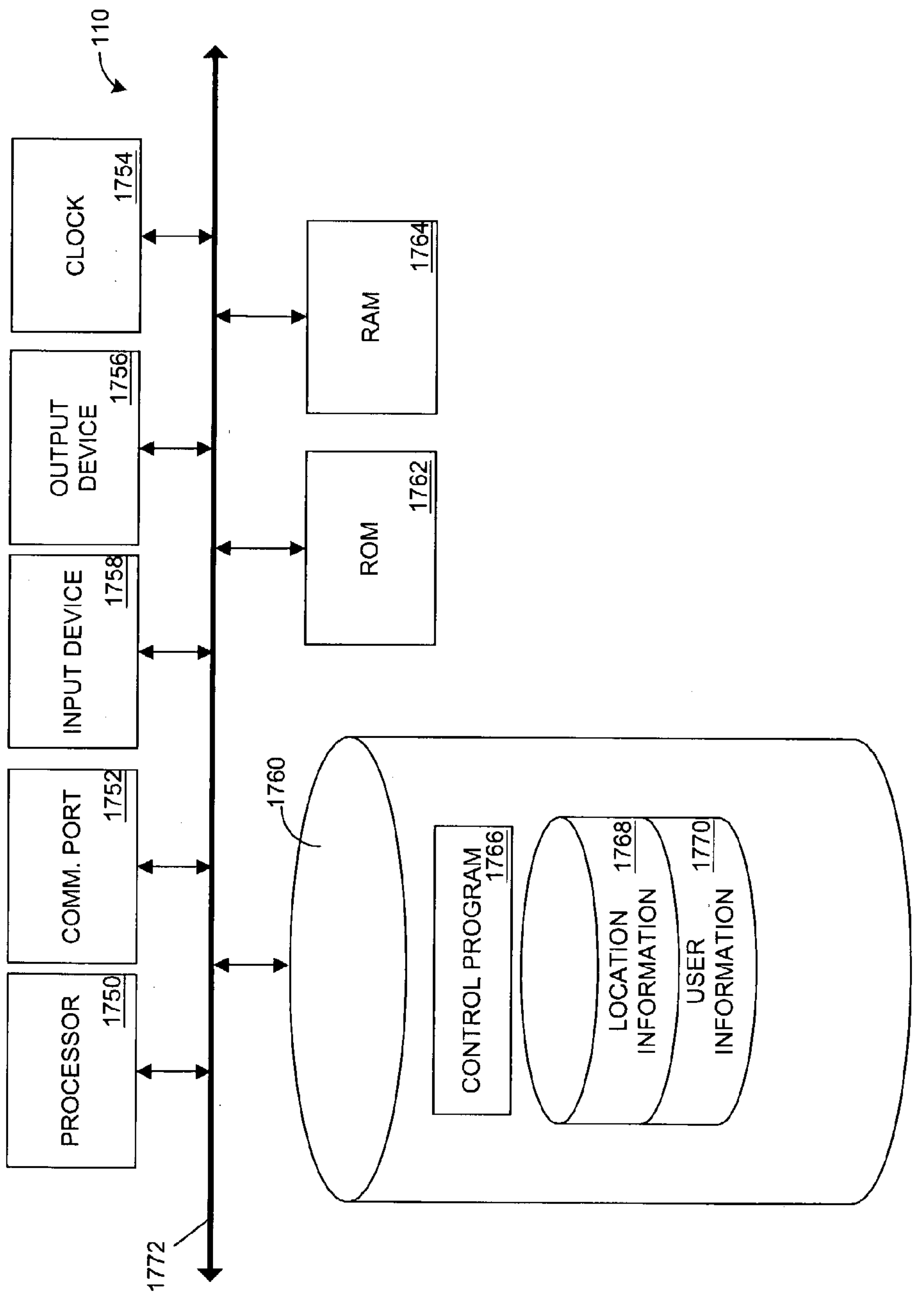
FIG. 21 is a block diagram of representative components for the server of FIG. 1.

Now referring to FIG. 21, a representative block diagram of a server or controller 110 is illustrated. The server 110 may include a processor, microchip, central processing unit, or computer 1750 that is in communication with or otherwise uses or includes one or more communication ports 1752 for communicating with user devices and/or other devices. Communication ports may include such things as local area network adapters, wireless communication devices, Bluetooth technology, etc. The server 110 also may include an internal clock element 1754 to maintain an accurate time and date for the server 110, create time stamps for communications received or sent by the server 110, etc.

If desired, the server 110 may include one or more output devices 1756 such as a printer, infrared or other transmitter, antenna, audio speaker, display screen or monitor, text to speech converter, etc., as well as one or more input devices 1758 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 110 may include a memory or data storage device 1760 to store information, software, databases, communications, device drivers, etc. The memory or data storage device 1760 preferably comprises an appropriate combination of magnetic, optical and/or semiconductor memory, and may include, for example, Read-Only Memory (ROM), Random Access Memory (RAM), a tape drive, flash memory, a floppy disk drive, a Zip™ disk drive, a compact disc and/or a hard disk. The server 110 also may include separate ROM 1762 and RAM 1764.

The processor 1750 and the data storage device 1760 in the server 110 each may be, for example: (i) located entirely within a single computer or other computing device; or (ii) connected to each other by a remote communication medium, such as a serial port cable, telephone line or radio frequency transceiver. In one embodiment, the server 110 may comprise one or more computers that are connected to a remote server computer for maintaining databases.

In some embodiments, a conventional personal computer, host computer, or workstation with sufficient memory and processing capability may be used as the server 110. In one embodiment, the server 110 operates as or includes a Web server for an Internet environment. The server 110 preferably is capable of high volume transaction processing, performing a significant number of mathematical calculations in processing communications and database searches. A Pentium™ microprocessor, such as the Pentium III™ or IV™ microprocessor manufactured by Intel Corporation, may be used for the processor 1750. Equivalent processors are available from Motorola, Inc., AMD, or Sun Microsystems, Inc. The processor 1750 also may comprise one or more microprocessors, computers, computer systems, etc.

Software may be resident and operating or operational on the server 110. The software may be stored on the data storage device 1760 and may include a control program 1766 for operating the server, databases, etc. The control program 1766 may control the processor 1750. The processor 1750 preferably performs instructions of the control program 1766, and thereby operates in accordance with the present invention, and particularly in accordance with the methods described in detail herein. The control program 1766 may be stored in a compressed, uncompiled and/or encrypted format. The control program 1766 furthermore includes program elements that may be necessary, such as an operating system, a database management system and device drivers for allowing the processor 1750 to interface with peripheral devices, databases, etc. Appropriate program elements are known to those skilled in the art, and need not be described in detail herein.

The server 110 also may include or store information regarding users, user devices, parking locations, parking products, interface configurations, screens, communications, etc. For example, information regarding one or more parking locations may be stored in a parking location information database 1768 for use by the server 110 or another device or entity. Information regarding one or more parking products may be stored in a parking products information database 1770 for use by the server 110 or another device or entity. In some embodiments, some or all of one or more of the databases may be stored or mirrored remotely from or locally to the server 110.

According to an embodiment of the present invention, the instructions of the control program may be read into a main memory from another computer-readable medium, such as from the ROM 1762 to the RAM 1764. Execution of sequences of the instructions in the control program causes the processor 1750 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 1750, communication port 1752, clock 1754, output device 1756, input device 1758, data storage device 1760, ROM 1762, and RAM 1764 may communicate or be connected directly or indirectly in a variety of ways. For example, the processor 1750, communication port 1752, clock 1754, output device 1756, input device 1758, data storage device 1760, ROM 1762, and RAM 1764 may be connected via a bus 1772.

While specific implementations and hardware configurations for servers 110 have been illustrated, it should be noted that other implementations and hardware/software configurations are possible and that no specific implementation or hardware/software configuration is needed. Thus, not all of the components illustrated in FIG. 21 may be needed for a server implementing the methods disclosed herein.

User Device

As mentioned above, user device may be or include any of a number of different types of devices, including, but not limited to a personal computer, portable computer, mobile or fixed user station, workstation, network terminal or server, telephone, beeper, kiosk, dumb terminal, personal digital assistant, facsimile machine, two-way pager, radio, cable set-top box, etc. In some embodiments, a user device may have the same structure or configuration as the server 110 illustrated in FIG. 21 and include some or all of the components of the server 110.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for managing data regarding a parking location, comprising:

providing an interface adapted to receive data associated with at least one parking location, said data being indicative of revenue associated with said at least one parking location and a monthly parker;

receiving said data via said interface; and providing a presentation of said data via said interface;
determining an identifier associated with said at least one parking location; and
configuring said interface based on said identifier.

2. The method of claim 1, wherein said providing an interface includes providing said interface via a Web site.

3. The method of claim 1, wherein said receiving data includes receiving said data from a device located at said at least one parking location.

4. The method of claim 1, wherein said data is associated with at least two different parking locations.

5. The method of claim 1, further comprising:
storing said data in a central location.

6. The method of claim 1, further comprising:
providing access to at least a portion of said data by an application.

7. The method of claim 1, wherein said interface is adapted to receive data indicative of
a number of drops made for said at least one parking location.

8. The method of claim 1, wherein said interface is adapted to receive data indicative of at least one of the following:
a number of voided tickets associated with said at least one parking location;
a number of held tickets associated with said at least one parking location; and
a reason why a voided ticket cart be accepted at said at least one parking location.

9. The method of claim 1, wherein said providing a presentation of said data further comprises data indicative of at least one of the following:
a number of tickets issued for said at least one parking location; and
a number of tickets received at said at least one parking location.

10. The method of claim 1, wherein said interface is selectively configurable regarding a presentation thereof.

11. The method of claim 1, wherein said presentation further comprises data indicative of a reconciliation of data associated with said at least one parking location.

12. The method of claim 1, further comprising receiving data associated said at least one parking location and at least one of a product offered at said at least one parking location and a counter used at said at least one parking location.

13. The method of claim 1, wherein said interface is operated on a device remote from said at least one parking location.

14. The method of claim 1 wherein said data further comprises being indicative of revenue associated with said at least one parking location and a transient parker.

15. A system for managing data regarding a parking location, comprising:
a memory;
a communication port; and
a processor connected to said memory and said communication port, said processor being operative to:
provide an interface adapted to receive data associated with at least one parking location and indicative of revenue associated with said at least one parking location and a monthly parker;
receive data via said interface;
provide a presentation of said data via said interface;
determine an identifier associated with said at least one parking location and configure said interface based on said identifier.

16. The system of claim 15, wherein said interface is provided includes providing said interface via a Web site.

17. The system of claim 15, wherein receiving said data includes receiving said data from a device located at said at least one parking location.

18. The system of claim 15, wherein said processor further comprises being operative to receive data associated with at least two different parking locations.

19. The system of claim 15, wherein said processor further comprises being operative to store data associated with said at least one parking location in a central location.

20. The system of claim 15, wherein said processor further comprises being operative to provide access to at least a portion of said data by an application.

21. The system of claim 15, wherein said interface is adapted to receive data indicative of a number of drops made for said at least one parking location.

22. The system of claim 15, wherein said interface is adapted to receive data indicative of at least one of the following:
a number of voided tickets associated with said at least one parking location;
a number of held tickets associated with said at least one parking location; and
a reason why a voided ticket can be accepted at said at least one parking location.

23. The system of claim 15, wherein said presentation data further comprises data indicative of at least one of the following:
a number of tickets issued for said at least one parking location; and
a number of tickets received at said at least one parking location.

24. The system of claim 15, wherein a presentation of said interface is selectively configurable.

25. The system of claim 15, wherein said presentation comprises data indicative of a reconciliation of revenues associated with said at least one parking location.

26. The system of claim 15, wherein said processor further comprises being operative to receive data associated with at least one parking location via said interface, said data being indicative of at least one of a product offered at said at least one parking location and a counter used at said at least one parking location.

27. The system of claim 15, wherein said interface is operated on a device remote from said at least one parking location.

28. The system of claim 15, wherein said data further comprises being indicative of revenue associated with said at least one parking location and a transient parker.

29. A computer program product in a computer readable medium for managing data regarding a parking location, comprising:
instructions for implementing an interface adapted to collect data associated with at least one parking location and indicative of revenue associated with said at least one parking location and a monthly or a transient parker;
instructions for receiving data via said interface;
instructions to provide a presentation of said data via said interface; and
instructions to determine an identifier associated with said at least one parking location; and
instructions to configure said interface based on said identifier.

* * * * *